United States Patent [19]
Ogura

[11] Patent Number: 5,761,218
[45] Date of Patent: Jun. 2, 1998

[54] METHOD OF AND APPARATUS FOR INTERPOLATING DIGITAL SIGNAL, AND APPARATUS FOR AND METHOS OF RECORDING AND/OR PLAYING BACK RECORDING MEDIUM

[75] Inventor: Yasuhiro Ogura, Tokyo, Japan

[73] Assignee: Sony Corporation, Tokyo, Japan

[21] Appl. No.: 682,563

[22] PCT Filed: Dec. 1, 1995

[86] PCT No.: PCT/JP95/02457

§ 371 Date: Sep. 23, 1996

§ 102(e) Date: Sep. 23, 1996

[87] PCT Pub. No.: WO96/17449

PCT Pub. Date: Jun. 6, 1996

[30] Foreign Application Priority Data

Dec. 2, 1994 [JP] Japan ................................. 6-299814
Mar. 17, 1995 [JP] Japan ................................. 7-059225

[51] Int. Cl.$^6$ ............................. G11B 20/18; G11B 20/24; H04B 14/04; H04B 15/00
[52] U.S. Cl. ............................. 371/30; 371/31; 375/254
[58] Field of Search ..................... 371/31, 30; 375/254, 375/346, 350; 381/94.1, 94.4, 94.8

[56] References Cited

U.S. PATENT DOCUMENTS 4,451,921  5/1984  Odaka ................................. 371/48
5,586,192 12/1996  De Bijl et al. ..................... 381/94.8

FOREIGN PATENT DOCUMENTS 52-40012   3/1977  Japan .
6-120908   4/1994  Japan .

*Primary Examiner*—Stephen M. Baker
*Attorney, Agent, or Firm*—Jay H. Maioli

[57] ABSTRACT

An apparatus and method for interpolating a digital signal where an input data signal from a data input terminal 1 is supplied through a memory 2 to an FIR low-pass digital filter 4. The memory 2 is controlled by a control circuit 6 to supply data preceding and following data which have suffered an error to the digital filter 4 to extract values A, and B. The values A, and B are calculated by an interpolation data generating circuit 7 to generate a value Y0. The data preceding and following data which have suffered an error is supplied to the digital filter 4 to extract a value A0. To the value A0, there is added values Bn calculated in advance by supplying all interpolation data which the error portion can take to an arbitrary position of the digital filter 4. The sum is compared with the value Y0. Interpolation data is generated according to a value Bn at which the sum is closest to the value Y0, and interpolation data is delivered from a data selector 3 to a data output terminal 8. This arrangement is capable of interpolating a digital signal digitized in an arbitrary small number of bits.

48 Claims, 30 Drawing Sheets

For N = 4

FIG. 6

[ TABLE 1 ]

| $c\,0$ | 1.0 | $c\,6$ | 84.0 | $c\,12$ | 315.0 | $c\,18$ | 246.0 | $c\,24$ | 35.0 |
|---|---|---|---|---|---|---|---|---|---|
| $c\,1$ | 4.0 | $c\,7$ | 120.0 | $c\,13$ | 336.0 | $c\,19$ | 204.0 | $c\,25$ | 20.0 |
| $c\,2$ | 10.0 | $c\,8$ | 161.0 | $c\,14$ | 344.0 | $c\,20$ | 161.0 | $c\,26$ | 10.0 |
| $c\,3$ | 20.0 | $c\,9$ | 204.0 | $c\,15$ | 336.0 | $c\,21$ | 120.0 | $c\,27$ | 4.0 |
| $c\,4$ | 35.0 | $c\,10$ | 246.0 | $c\,16$ | 315.0 | $c\,22$ | 84.0 | $c\,28$ | 1.0 |
| $c\,5$ | 56.0 | $c\,11$ | 284.0 | $c\,17$ | 284.0 | $c\,23$ | 56.0 | | |

FIG. 7

[ TABLE 2 ]

| b[-29] | -1.0 | b[-13] | 1.0 | b[3] | 1.0 | b[19] | 1.0 |
|---|---|---|---|---|---|---|---|
| b[-28] | 1.0 | b[-12] | -1.0 | b[4] | -1.0 | b[20] | 1.0 |
| b[-27] | 1.0 | b[-11] | 1.0 | b[5] | 1.0 | b[21] | -1.0 |
| b[-26] | 1.0 | b[-10] | -1.0 | b[6] | -1.0 | b[22] | -1.0 |
| b[-25] | -1.0 | b[-9] | 1.0 | b[7] | 1.0 | b[23] | -1.0 |
| b[-24] | -1.0 | b[-8] | 1.0 | b[8] | -1.0 | b[24] | 1.0 |
| b[-23] | -1.0 | b[-7] | -1.0 | b[9] | 1.0 | b[25] | 1.0 |
| b[-22] | 1.0 | b[-6] | -1.0 | b[10] | -1.0 | b[26] | -1.0 |
| b[-21] | 1.0 | b[-5] | -1.0 | b[11] | -1.0 | b[27] | 1.0 |
| b[-20] | -1.0 | b[-4] | 1.0 | b[12] | 1.0 | b[28] | -1.0 |
| b[-19] | 1.0 | b[-3] | 1.0 | b[13] | 1.0 | b[29] | 1.0 |
| b[-18] | 1.0 | b[-2] | -1.0 | b[14] | 1.0 | b[30] | -1.0 |
| b[-17] | -1.0 | b[-1] | 1.0 | b[15] | -1.0 | b[31] | 1.0 |
| b[-16] | -1.0 | b[0] | -1.0 | b[16] | -1.0 | b[32] | 1.0 |
| b[-15] | -1.0 | b[1] | 1.0 | b[17] | -1.0 | | |
| b[-14] | 1.0 | b[2] | -1.0 | b[18] | 1.0 | | |

FIG. 12

[ TABLE 3 ]

| C0 | 1.0 | C9 | 204.0 | C18 | 162.0 | C27 | -332.0 | C36 | -35.0 |
|---|---|---|---|---|---|---|---|---|---|
| C1 | 4.0 | C10 | 246.0 | C19 | 84.0 | C28 | -314.0 | C37 | -20.0 |
| C2 | 10.0 | C11 | 284.0 | C20 | 0.0 | C29 | -284.0 | C38 | -10.0 |
| C3 | 20.0 | C12 | 314.0 | C21 | -84.0 | C30 | -246.0 | C39 | -4.0 |
| C4 | 35.0 | C13 | 332.0 | C22 | -162.0 | C31 | -204.0 | C40 | -1.0 |
| C5 | 56.0 | C14 | 334.0 | C23 | -228.0 | C32 | -161.0 | | |
| C6 | 84.0 | C15 | 316.0 | C24 | -280.0 | C33 | -120.0 | | |
| C7 | 120.0 | C16 | 280.0 | C25 | -316.0 | C34 | -84.0 | | |
| C8 | 161.0 | C17 | 228.0 | C26 | -334.0 | C35 | -56.0 | | |

FIG. 22

[ TABLE 4 ]

```
65593935554d58e36353534d54d554d2
d334d354ccd2d2d2cd32d32cccacccb2
ccacb2cb2cacaaccab2caacab2aacaac
b2aa72c9cb272aaab27272aaaaaaac71
ac6a6c9c7271c6a6aa726c6aaa99a9aa
aaaa6a6a69a9b1aaa999a9a6aaa6aa66
99a6a6aaa9a666669ac6a6a666666aa6
c669a65a66aaaa669a5a66aaaa6a6699
9aaaa6c69a66a6aaa6c6aa69aa6aaa72
a9b1a6a9b1caa72a6c6a9c9cac72a6c6
b1b2aab2aab271caacaacacaac72aaad
2b32b1b29cb32ccb2ac9caacccccb2aa
acab33332b2b2aaad33332caacaab4cc
d2cb2ab2b2cd34cb2cab2b3353332cca
b32d33352d2b2cb2d4d334b32b333334
d34b32cb2d34d334cb32b3334d4cccca
ccb34d334cccab334b533332cb32d2d3
334b2cb32ccd2d32ccb2b32d34cb32cb
2ccb334cd2b2b3332d334b4acccb334c
cd332cccb4cd334cccccccb534d3332d
34b534ccd334cd2d4d34cd34cd33534d
4cd34d4cd354d353535335354d5534d4
d4d5535554d4d35555555534d5393958
```

FIG. 23

[ TABLE 5 ]

| Pmn (m\n) | (0) | (1) | (2) | (3) | (4) | (5) | (6) | (7) | (8) | (9) | (a) | (b) | (c) | (d) | (e) | (f) |
|---|---|---|---|---|---|---|---|---|---|---|---|---|---|---|---|---|
| (0) | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| (1) | 0.00 | 0.00 | 0.00 | 0.00 | 0.00 | 0.00 | 0.00 | 0.00 | 0.00 | 0.00 | 0.51 | 0.16 | 0.30 | 0.00 | 0.00 | 0.00 |
| (2) | 0.00 | 0.00 | 0.00 | 0.00 | 0.00 | 0.00 | 0.00 | 0.00 | 0.00 | 0.00 | 0.26 | 0.17 | 0.35 | 0.13 | 0.00 | 0.00 |
| (3) | 0.00 | 0.00 | 0.13 | 0.00 | 0.00 | 0.25 | 0.00 | 0.00 | 0.03 | 0.07 | 0.00 | 0.00 | 0.00 | 0.00 | 0.13 | 0.00 |
| (4) | 0.00 | 0.00 | 0.00 | 0.13 | 0.00 | 0.00 | 0.00 | 0.00 | 0.00 | 0.00 | 0.02 | 0.12 | 0.23 | 0.50 | 0.00 | 0.00 |
| (5) | 0.00 | 0.00 | 0.00 | 0.05 | 0.08 | 0.38 | 0.13 | 0.00 | 0.02 | 0.21 | 0.04 | 0.00 | 0.00 | 0.00 | 0.00 | 0.00 |
| (6) | 0.00 | 0.00 | 0.00 | 0.03 | 0.01 | 0.27 | 0.28 | 0.00 | 0.00 | 0.19 | 0.17 | 0.01 | 0.03 | 0.00 | 0.00 | 0.00 |
| (7) | 0.00 | 0.30 | 0.67 | 0.00 | 0.00 | 0.00 | 0.00 | 0.00 | 0.00 | 0.00 | 0.00 | 0.00 | 0.00 | 0.67 | 0.30 | 0.00 |
| (8) | 0.00 | 0.00 | 0.00 | 0.03 | 0.01 | 0.00 | 0.18 | 0.02 | 0.00 | 0.27 | 0.00 | 0.00 | 0.02 | 0.00 | 0.00 | 0.00 |
| (9) | 0.00 | 0.00 | 0.00 | 0.23 | 0.00 | 0.17 | 0.21 | 0.03 | 0.00 | 0.13 | 0.00 | 0.02 | 0.05 | 0.00 | 0.00 | 0.00 |
| (a) | 0.00 | 0.00 | 0.50 | 0.00 | 0.12 | 0.04 | 0.00 | 0.00 | 0.00 | 0.04 | 0.38 | 0.08 | 0.13 | 0.00 | 0.00 | 0.00 |
| (b) | 0.00 | 0.00 | 0.00 | 0.35 | 0.00 | 0.02 | 0.07 | 0.00 | 0.05 | 0.02 | 0.00 | 0.00 | 0.00 | 0.13 | 0.00 | 0.00 |
| (c) | 0.00 | 0.13 | 0.13 | 0.30 | 0.17 | 0.00 | 0.03 | 0.00 | 0.00 | 0.00 | 0.25 | 0.20 | 0.28 | 0.00 | 0.00 | 0.00 |
| (d) | 0.00 | 0.00 | 0.00 | 0.00 | 0.16 | 0.26 | 0.02 | 0.00 | 0.00 | 0.00 | 0.00 | 0.00 | 0.00 | 0.00 | 0.00 | 0.00 |
| (e) | 0.00 | 0.00 | 0.00 | 0.00 | 0.00 | 0.51 | 0.00 | 0.00 | 0.00 | 0.00 | 0.00 | 0.00 | 0.00 | 0.00 | 0.00 | 0.00 |
| (f) | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

FIG. 24

[ TABLE 6 ]

| | |
|---|---|
| [0] → [5] | [8] → [d] |
| [1] → [a] | [9] → [9] |
| [2] → [c] | [a] → [a] |
| [3] → [3] | [b] → [2] |
| [4] → [d] | [c] → [c] |
| [5] → [5] | [d] → [3] |
| [6] → [6] | [e] → [5] |
| [7] → [2] | [f] → [5] |

FIG. 31
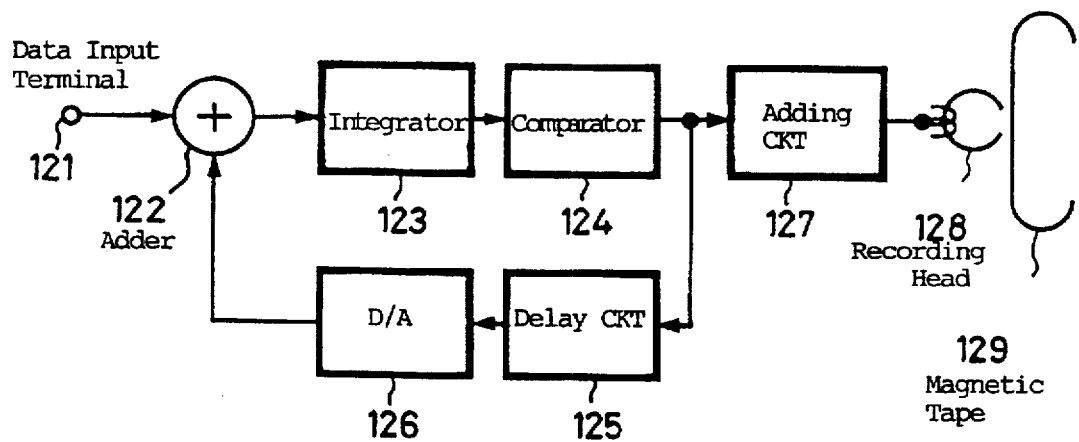
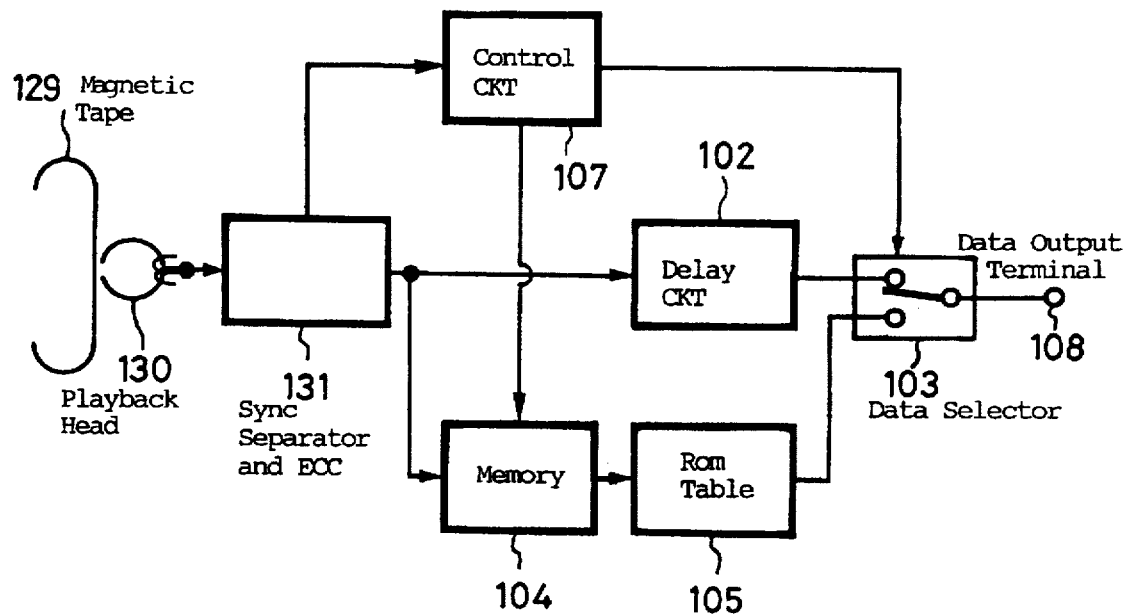

METHOD OF AND APPARATUS FOR INTERPOLATING DIGITAL SIGNAL, AND APPARATUS FOR AND METHOS OF RECORDING AND/OR PLAYING BACK RECORDING MEDIUM

TECHNICAL FIELD

The present invention relates to a method of and apparatus for interpolating a digital signal, and more particularly to a method of and apparatus for interpolating a digital signal which has been digitized with a small number of bits.

BACKGROUND ART

Recording/playback mediums such as CDs (Compact Discs), DATs (Digital Audio Tapes), etc. and digital audio broadcasting services such as satellite broadcasting services have heretofore been put to use as means for digitizing and transmitting audio signals (the term "transmission" used herein includes recording and reproduction of signals). In such a digital audio transmission apparatus, it has been customary to convert an analog signal into a digital signal according to a prescribed format including a sampling frequency of 48 kHz, 44.1 kHz, or the like and a number of quantizing bits such as 16 bits.

In the conventional digital audio transmission apparatus, the number of quantizing bits for digital audio signals generally governs the dynamic range of audio signals to be demodulated. For transmitting audio signals of higher sound quality, therefore, it is necessary to expand the number of quantizing bits from the current standard of 16 bits to 20 or 24 bits. Once a format for signal transmission is determined, however, since the number of quantizing bits cannot easily be expanded, it is not possible to produce audio signals of higher sound quality from the digital audio transmission apparatus.

One process known as $\Sigma\Delta$ (sigma-delta) modulation for digitizing audio signals has been proposed (see "AD/DA converter and digital filter" by Yoshio Yamazaki, Japan Acoustic Society Journal Vol. 46, No. 3 (1990), pages 251–257).

FIG. 1 of the accompanying drawings shows an arrangement for 1-bit $\Sigma\Delta$ modulation. As shown in FIG. 1, an audio signal inputted from an input terminal 91 is supplied through an adder 92 to an integrator 93, which supplies; an output signal to a comparator 94. The comparator 94 compares the output signal from the integrator 93 with a midpoint potential of the inputted audio signal, and quantizes the output signal from the integrator 93 into a 1-bit quantized signal in each of sampling periods. The frequency of the sampling periods (sampling frequency) is 64 or 128 times the conventional sampling frequency of 48 kHz or 44.1 kHz.

The quantized signal is supplied to a delay unit 95, which delays the quantized signal by one sampling period. The delayed signal is then supplied through a 1-bit D/A converter 96 to the adder 92, which adds the delayed signal to the audio signal inputted from the input terminal 92. The quantized signal from the comparator 94 is also delivered to an output terminal 97. According to the above $\Sigma\Delta$ modulation, as also indicated by the literature referred to above, it is possible to obtain a digital audio signal having a wide dynamic range even with a few number of 1 bits by sufficiently increasing the frequency of sampling periods (sampling frequency).

If the transmission system for transmitting the above digital audio signal suffers a failure, resulting in a signal loss, the reproduced digital signal is fixed to a value of either "1" or "0". For the digital audio signal which is not processed, e.g., which is produced by the arrangement shown in FIG. 1, the successive values of "1" and "0" correspond respectively to a positive maximum value and a negative maximum value of the demodulated signal. Therefore, in the event that part of the signal is lost while in the transmission system, maximum-level noise is produced at the lost part of the signal, tending to break a monitor amplifier or speaker.

Accordingly in CDs, DATs, etc., a signal format is determined such that the successive values of "1" and "0" will become an intermediate value of the demodulated signal. Therefore, no maximum-level noise is produced even when the above signal loss occurs. An error-correcting code is included in a digital signal which is transmitted, thereby recovering the signal in a certain range even in the event of a signal loss. Furthermore, with respect to a signal loss beyond the capability of the error-correcting code, the signal loss is interpolated using preceding and following data or the like, or data preceding the signal loss are held, preventing the listener from a problem in hearing the reproduced sound.

For interpolating such a signal loss, a linear interpolation process as shown in FIG. 2 of the accompanying drawings, for example, is carried out. As shown in FIG. 2, interpolation data Dn (n=an integer of 1~N) are determined according to the following equation:

$$Dn = A + n \times (B-A)/N \qquad (1)$$

where N is the number of lost data, A is the value of data preceding the lost data, and B is the value of data following the lost data.

FIG. 3 of the accompanying drawings shows an interpolating circuit for carrying out the linear interpolation process described above. As shown in FIG. 3, a digital audio signal is supplied to a data input terminal 81. The digital audio signal is supplied as an inputted data signal from the data input terminal 81 through a memory 82 to a calculating circuit 84. An error-detecting signal indicative of whether the digital audio signal supplied to the data input terminal 81 is correct or not is supplied to an error-correcting signal input terminal 85. The error-detecting signal from the error-correcting signal input terminal 85 is supplied to a control circuit 86.

When the error-detecting signal is supplied to the error-correcting signal input terminal 85, the control circuit 86 supplies a control signal to the memory 82 and the calculating circuit 84, which effects the linear interpolation process according to the above equation (1) using the data stored in the memory 82. Interpolation data produced by the calculating circuit 84 are supplied to a data selector 83 which is controlled by the control signal from the control circuit 86. During a period in which the error-detecting signal is supplied, the data selector 83 selects the interpolation data from the calculating circuit 84 and delivers the interpolation data to a data output terminal 87.

In the $\Sigma\Delta$ modulation, since each data item has a long word length and comprises 1-bit data, lost data cannot be interpolated using preceding and following data. One proposed solution may be to replace error data with preceding data which have the same length as the error data (i.e., to hold the preceding data), as shown in FIG. 4 of the accompanying drawings. The proposal, however, is not practical as it may sometimes produce very large noise.

Data produced according to the $\Sigma\Delta$ modulation may be converted into a signal format for CDs, DATs, or the like using a decimation filter. This process allows data to be interpolated in the same manner as the conventional process or replaced with the preceding data which are held, preventing the listener from a problem in hearing the reproduced sound. According to this process, however, signals which are processed have the same characteristics as those of signals for CDs, DATs, or the like, and fail to provide a wide frequency range and a wide dynamic range which are features of $\Sigma\Delta$ signals.

The conventional apparatus and methods have no means for recovering $\Sigma\Delta$ signals through interpolation in the event that it is lost due to a failure of the transmission system. Consequently, it has been highly difficult to use $\Sigma\Delta$ signals in the general transmission system.

The present invention has been made in view of the above problems. It is an object of the present invention to provide a method of and an apparatus for well interpolating error data of a digital signal which has been digitized with a small number of bits according to $\Sigma\Delta$ modulation or the like.

SUMMARY OF THE INVENTION

According to the present invention, a digital signal digitized in a predetermined small number of bits and containing an error portion is supplied, and interpolation data for the error portion are produced using a value produced by supplying the digital signal in which the error portion is at an arbitrary position and from which the error portion is removed to an arbitrary digital filter, and a value produced by supplying all interpolation data which the error portion can take to the arbitrary position of the digital filter. In this connection, there are disclosed a method of and an apparatus for interpolating a digital signal, and an apparatus for and a method of recording and/or playing back a recording medium.

BRIEF DESCRIPTION OF THE DRAWINGS

FIG. 6 is a diagram showing Table 1 illustrative of the method of interpolating a digital signal according to the first embodiment of the present invention;

FIG. 7 is a diagram showing Table 2 illustrative of the method of interpolating a digital signal according to the first embodiment of the present invention;

FIG. 12 is a diagram illustrative of a method of interpolating a digital signal according to a third embodiment of the present invention;

FIG. 22 is a diagram illustrative of a method of interpolating a digital signal according to a fifth embodiment of the present invention;

FIG. 23 is a diagram illustrative of the method of interpolating a digital signal according to the fifth embodiment of the present invention;

FIG. 24 is a diagram illustrative of the method of interpolating a digital signal according to the fifth embodiment of the present invention;

FIG. 31 is a block diagram of an apparatus for recording and reproducing a digital signal according to an embodiment of the present invention.

BEST MODE FOR CARRYING OUT THE INVENTION

Figure 1:
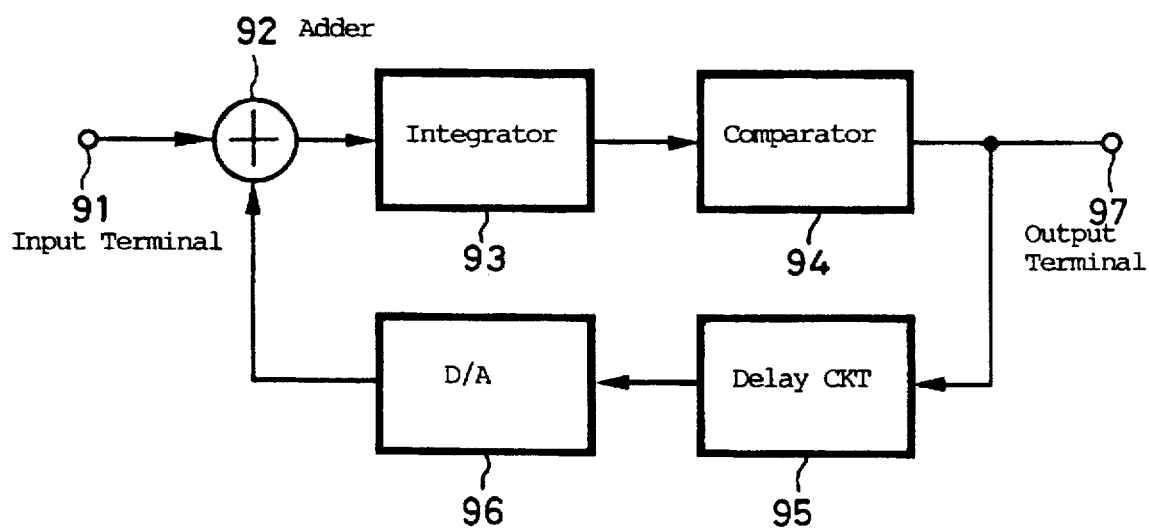
FIG. 1 is a block diagram of an arrangement for 1-bit $\Sigma\Delta$ modulation.
Figure 2:
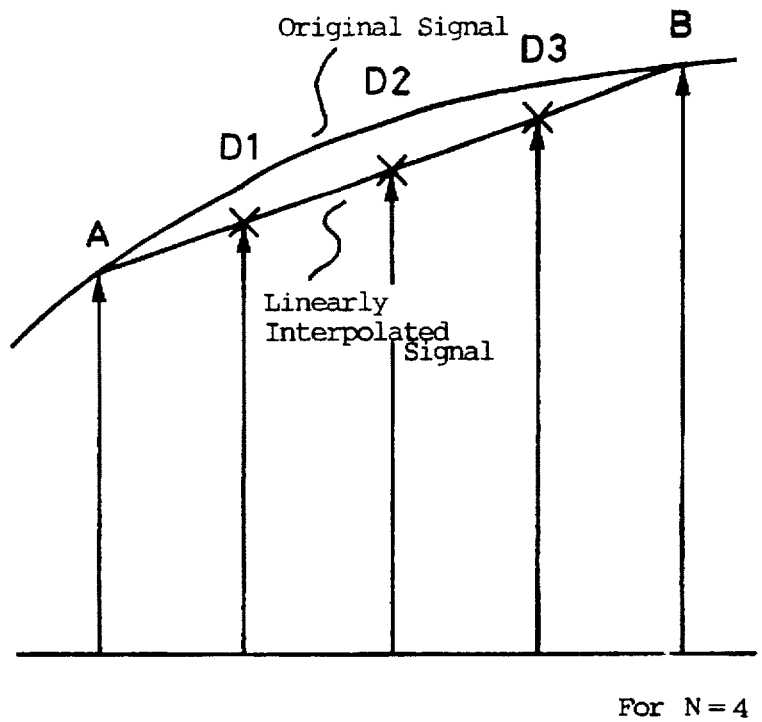
FIG. 2 is a diagram illustrative of a linear interpolation process.
Figure 3:
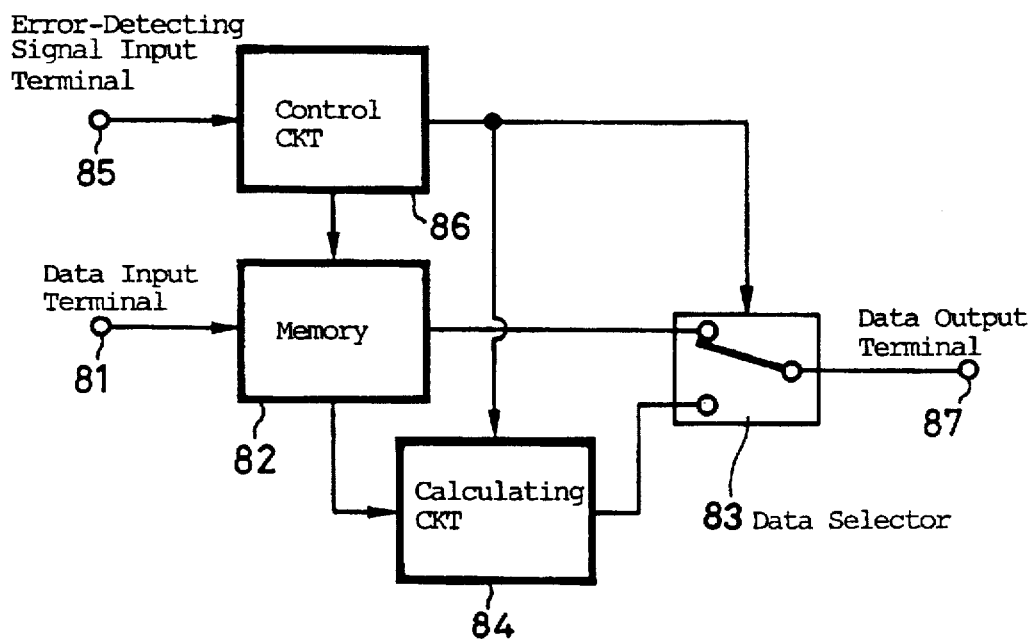
FIG. 3 is a block diagram of a conventional apparatus for interpolating a digital signal.
Figure 4:
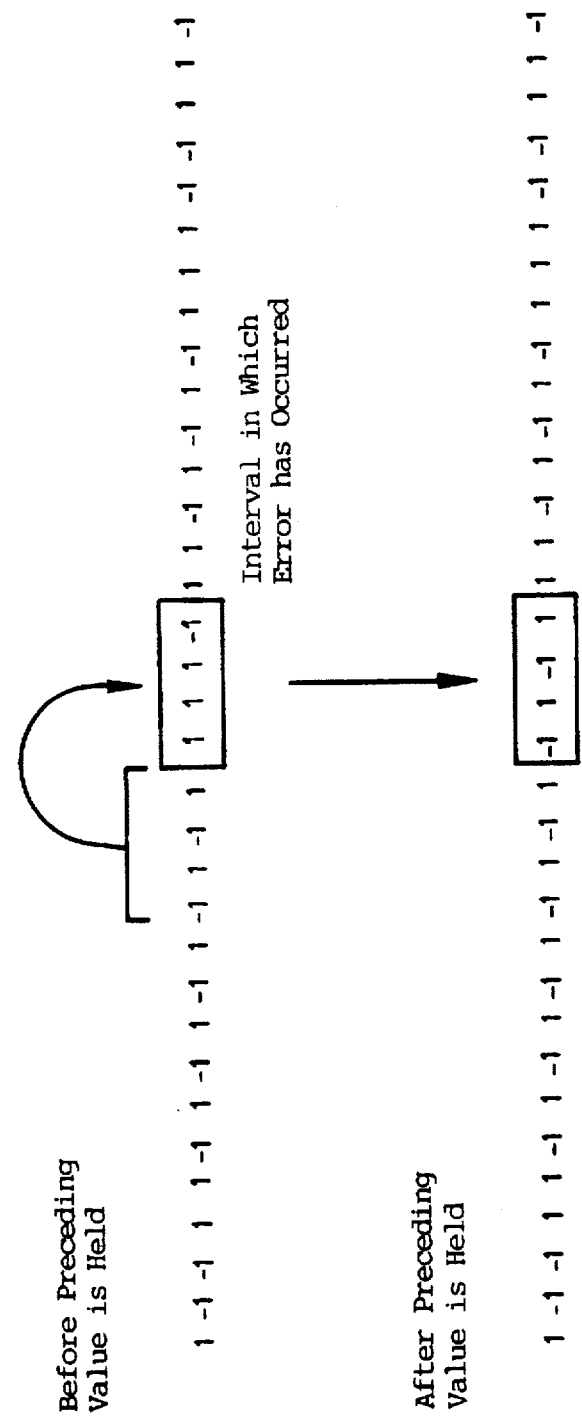
FIG. 4 is a diagram illustrative of a process of holding preceding data.

A method of and an apparatus for interpolating a digital signal according to the present invention will hereinafter be described in detail below.

According to the present invention, a $\Sigma\Delta$ EA signal which has suffered an error is interpolated in the form of a $\Sigma\Delta$ signal, and corrected into data which will present no problems for the user to hear the sound reproduced therefrom. Specifically, a $\Sigma\Delta$ signal which has suffered an error is predicted using a filter, and the error is interpolated using the predicted $\Sigma\Delta$ signal.

For example, if a $\Sigma\Delta$ signal comprising a train of data b0, b1, b2, ..., bm is applied to an n-tap FIR low-pass filter having coefficients c0, c1, c2, ..., cn-1, then the FIR filter produces an output signal Yn according to the following equation:

$$Yn = c0*b0 + c1*b1 + c2*b2 + \ldots + cn\text{-}1*bn\text{-}1.$$

If 4 bits (b0, b1, b2, b3) of a EA signal having a word length of 1 suffer an error, the FIR filter produces an output signal Yn as follows:

$$Yn = (c0*b0 + c1*b1 + c2*b2 + c3*b3) + (c4*b4 + \ldots + cn\text{-}1*bn\text{-}1).$$

Since the value of the first term (c0*b0+c1*b1+c2*b2+c3*b3) on the right-hand side of the above equation cannot be calculated because its data are lost, the second term (c4*b4+ ... +cn-1*bn-1) of the right-hand side can be calculated because the values of data b4~bn-1 are known. If it is assumed that the second term of the righthand side has a value of A0, then the above equation is expressed as follows:

$$Y0 = (c0*b0 + c1*b1 + c2*b2 + c3*b3) + A0.$$

Similarly, after 1 sample, 2 samples, and 3 samples, the filter produces output signals as follows:

$$Y1 = (c1*b0 + c2*b1 + c3*b2 + c4*b3) + A1,$$

$$Y2 = (c2*b0 + c3*b1 + c4*b2 + c5*b3) + A2, \text{ and}$$

$$Y3 = (c3*b0 + c4*b1 + c5*b2 + c6*b3) + A3.$$

The value of Yn can be determined by linear interpolation according to the equation:

$$Yn = A + n*(B-A)/N \tag{2}$$

where A is the value preceding the error, B is the value following the error, and N represents samples as the distance between the values A, B, as with the above equation (1). Therefore, Yn is expressed as follows:

$$(c0*b0 + c1*b1 + c2*b2 + c3*b3) + A0 = Y0,$$

$$(c1*b0 + c2*b1 + c3*b2 + c4*b3) + A1 = Y1,$$

$$(c2*b0 + c3*b1 + c4*b2 + c5*b3) + A2 = Y2, \text{ and}$$

$$(c3*b0 + c4*b1 + c5*b2 + c6*b3) + A3 = Y3. \tag{3}$$

When the simultaneous equations (3) are solved for b0~b3, the value of the lost data can be estimated.

Since the data word length of the data bn is actually 1 bit, the value of the data bn can be only either "1" or "−1". On the other hand, the solutions of the simultaneous equations (3) are of arbitrary values other than either "1" or "−1". Therefore, even if the value of the data is determined to be either "1" or "−1" based on the sign, for example, of the solutions of the simultaneous equations (3), the interpolated $\Sigma\Delta$ signal may possibly contain noise having a very large level.

Since as many such simultaneous equations as the number of taps of a low-pass filter can be generated by shifting samples, it may be possible to establish simultaneous equations:

$$c0*b0 + c1*b1 + c2*b2 + c3*b3 + A0 = Y0,$$

$$c1*b0 + c2*b1 + c3*b2 + c4*b3 + A1 = Y,$$

$$c2*b0 + c3*b1 + c4*b2 + c5*b3 + A2 = Y2,$$

$$c3*b0 + c4*b1 + c5*b2 + c6*b3 + A3 = Y3,$$

$$c4*b0 + c5*b1 + c6*b2 + c7*b3 + A4 = Y4,$$

$$c5*b0 + c6*b1 + c7*b2 + c8*b3 + A5 = Y5,$$

$$c6*b0 + c7*b1 + c8*b2 + c9*b3 + A6 = Y6, \text{ and}$$

$$c7*b0 + c8*b1 + c9*b2 + c10*b3 + A7 = Y7,$$

and to determine appropriate solutions using the method of least squares or the like. However, such a process results in complex calculations and is not practical.

According to a first embodiment of the present invention, the following process is devised: In view of the fact that the data bn can only take a value of either "1" or "−1", (c0*b0+c1*b1+c2*b2+c3*b3) on the left-hand side of the equations (3) can only take a total of 16 values due to a combination of "1" and "−1" of the four data b0~b3. All the 16 values are calculated in advance, and one of the 16 values is looked for which makes (c0*b0+c1*b1+c2*b2+c3*b3) closest to Y0.

Figure 5:
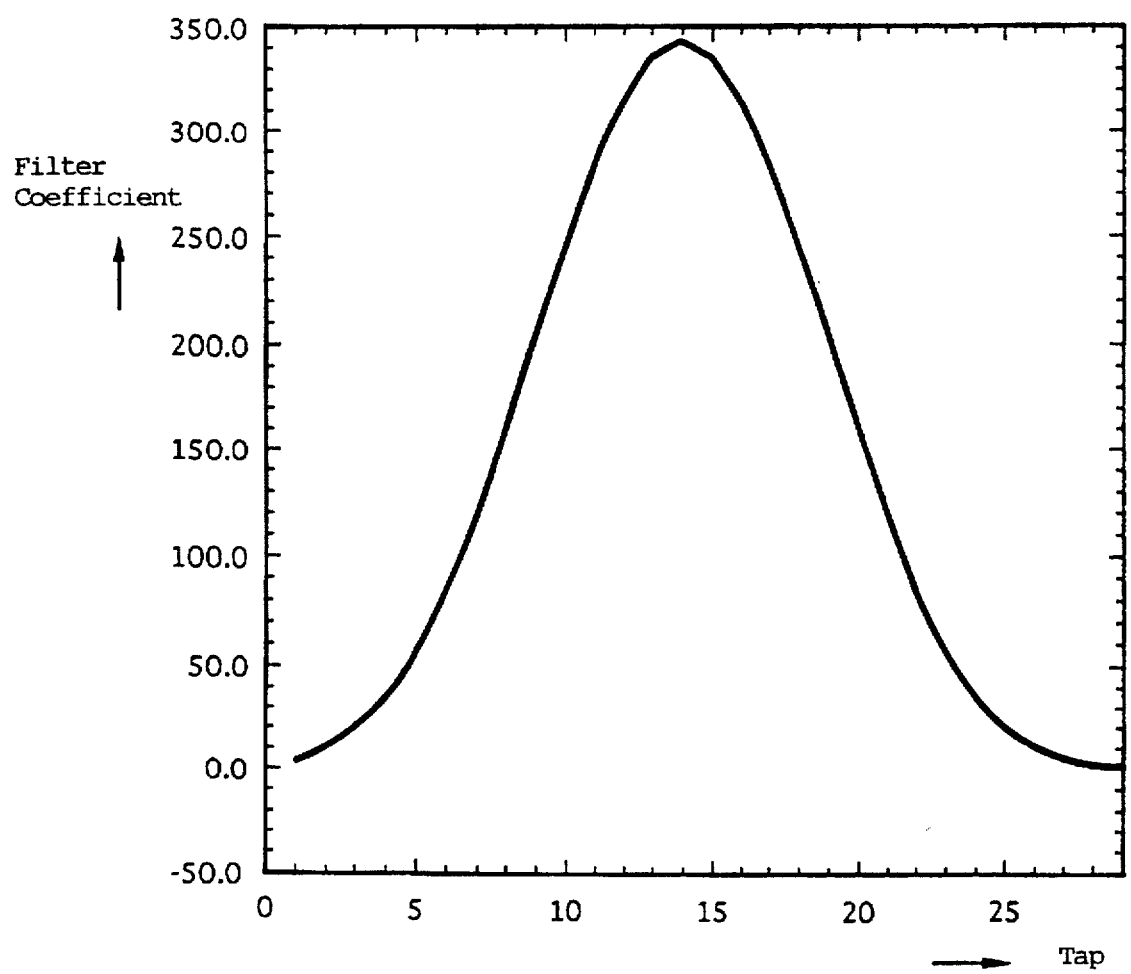
FIG. 5 is a diagram illustrative of a method of interpolating a digital signal according to a first embodiment of the present invention.
Figure 8:
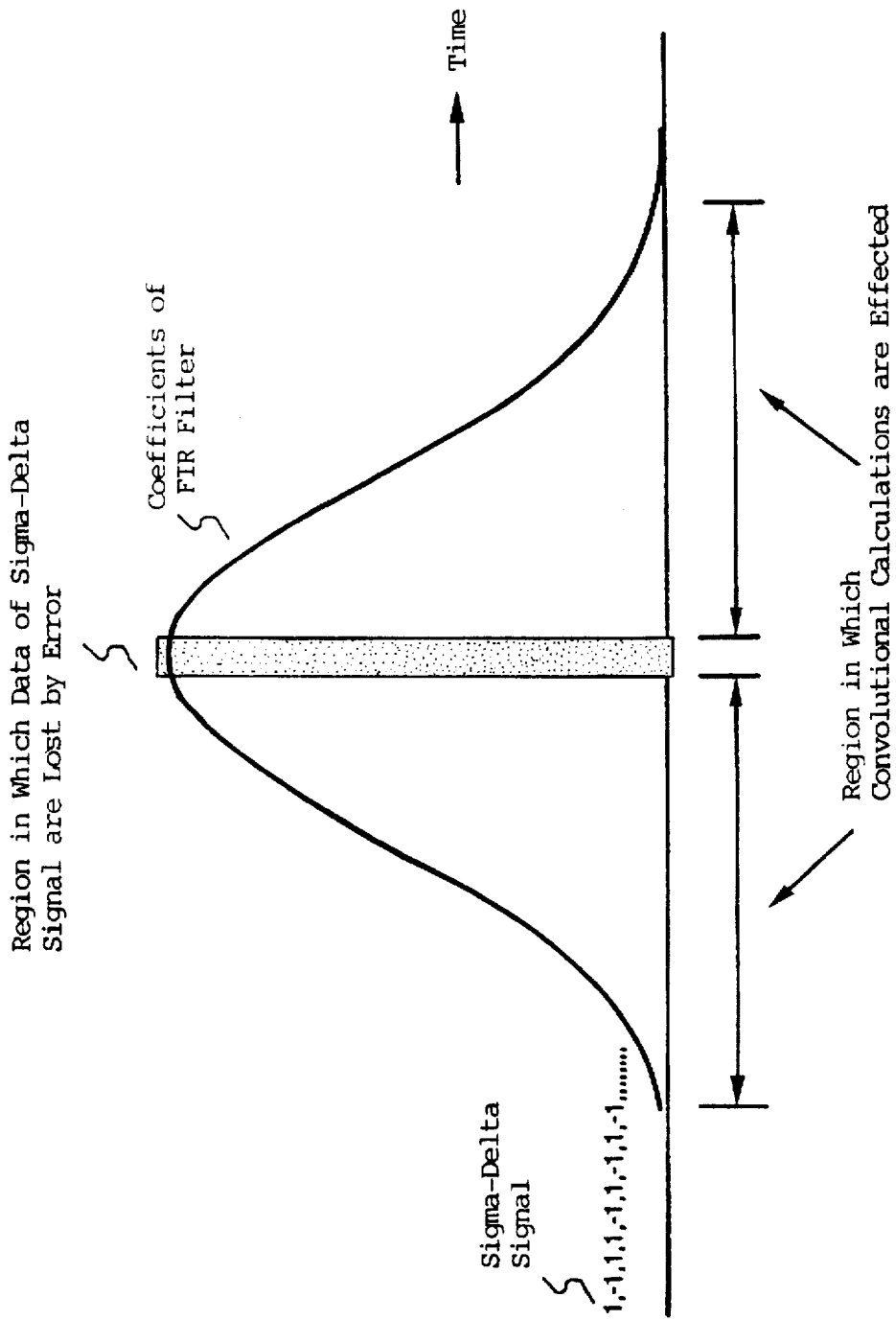
FIG. 8 is a diagram illustrative of the method of interpolating a digital signal according to the first embodiment of the present invention.

In an actual example, it is assumed that 4-bit data (b0, b1, b2, b3) of 1-bit data shown in Table 2 shown in FIG. 7 have suffered an error, and the data are interpolated using Table 1 shown in FIG. 5 and a 29-tap FIR filter shown in FIG. 6. The data shown in FIG. 7 represents by way of example a sine wave having a sampling frequency of 2.822 MHz, a signal frequency of 1 kHz, and an amplitude which is of −50 dB from the full scale. For carrying out the filter calculations according to the equations (3), the data which have suffered an error may be located in any phase of the FIR filter, but are assumed to be at the center of the FIR filter as shown in FIG. 8 for an easy understanding.

If terms which cannot be subject to filter calculations due to an error are represented by Bn, then the terms Bn are expressed by:

$$Bn = c12*b0 + c13*b1 + c14*b2 + c15*b3.$$

If remaining terms which can be subject to filter calculations in the absence of an error are represented by A0, then the terms A0 are expressed by:

$$A0 = c0*b(-12) + c1*b(-11) + \ldots + c,1*b(-2) + c11*b(-1) + c16*b4 + c17*b5 + \ldots + c27*b15 + c28*b16.$$

The equations (3) are now expressed by:

$Bn+A0=Y0.$ (4)

16 values of Bn where each of b0~b3 takes values of "1" and "−1" are calculated as follows:

When b0 = 1, b1 = 1, b2 = 1, b3 = 1,
  Bn = B0 = 1331.
When b0 = −1, b1 = 1, b2 = 1, b3 = 1,
  Bn = B1 = 701.
When b0 = 1, b1 = −1, b2 = 1, b3 = 1,
  Bn = B2 = 659.
When b0 = −1, b1 = −1, b2 = 1, b3 = 1,
  Bn = B3 = 29.
When b0 = 1, b1 = 1, b2 = −1, b3 = 1,
  Bn = B4 = 643.
When b0 = −1, b1 = 1, b2 = −1, b3 = 1,
  Bn = B5 = 13.
When b0 = 1, b1 = −1, b2 = −1, b3 = 1,
  Bn = B6 = −29.
When b0 = −1, b1 = −1, b2 = −1, b3 = 1,
  Bn = B7 = −659.
When b0 = 1, b1 = 1, b2 = 1, b3 = −1,
  Bn = B8 = 659.
When b0 = −1, b1 = 1, b2 = 1, b3 = −1,
  Bn = B9 = 29.
When b0 = 1, b1 = −1, b2 = 1, b3 = −1,
  Bn = B10 = −13.
When b0 = −1, b1 = −1, b2 = 1, b3 = −1,
  Bn = B11 = −643.
When b0 = 1, b1 = 1, b2 = −1, b3 = −1,
  Bn = B12 = −29.
When b0 = −1, b1 = 1, b2 = −1, b3 = −1,
  Bn = B13 = −659.
When b0 = 1, b1 = −1, b2 = −1, b3 = −1,
  Bn = B14 = −701.
When b0 = −1, b1 = −1, b2 = −1, b3 = −1,
  Bn = B14 = −1331.

Data portions with no error are subjected to filter calculations, resulting in:

$A0=-3.0.$

The value A of a filter output signal preceding data which suffer an error is indicated by:

$A=c0*b(-29)+c1*b(-28)+ \ldots +c27*b(-2)+c28*b(-1)=12.0.$

The value B of a filter output signal following data which suffer an error is indicated by:

$B=c0*b4+c1*b5+ \ldots +c27*b31+c28*b32=0.0$ $N=29+4=33$ $n=14.$

Therefore, using the equation (2), $Y0=A+n*(B-A)/N=12.0+14*(0.0-12.0)/33=6.9.$

Therefore, at the respective instances of EBn, when Bn=B0, Bn+A0=1328, when Bn=B1, Bn+A0=698, when Bn=B2, Bn+A0=656, when Bn=B3, Bn+A0=26, when Bn=B4, Bn+A0=640, when Bn=B5, Bn+A0=10, when Bn=B6, Bn+A0=−32, when Bn=B7, Bn+A0=−662, when Bn=B8, Bn+A0=657, when Bn=B9, Bn+A0=26, when Bn=B10, Bn+A0=−16, when Bn=B11, Bn+A0=−646, when Bn=B12, Bn+A0=−32, when Bn=B13, Bn+A0=−662, when Bn=B14, Bn+A0=−704, when Bn=B15, Bn+A0=−1334.

Therefore, the value of B5+A0=10 which is closest to an interpolation target value of Y0=6.9, i.e., B5: (b0=01, b1=1, b2=−1, b3=1)

is interpolation data which are to be determined. In this example, the interpolation data are in agreement with the original data in Table 2 shown in FIG. 7.

According to this method, when a digital signal which has been digitized in an arbitrary small number of bits and contains an error portion is supplied, interpolation data of the error portion is obtained using a value produced by supplying the data of the digital signal, in which the error portion is at an arbitrary position and from which the error portion is removed, to an arbitrary digital filter, and also a value produced by supplying all interpolation data, which the error portion can have, to an arbitrary position of the digital filter. As a result, it is possible to obtain interpolation data approximating the original data, thereby well interpolating the digital signal.

The sum of the value produced by supplying the data of the digital signal, from which the error portion is removed, to the arbitrary digital filter, and the value produced by supplying all interpolation data, which the error portion can have, to the digital filter is determined. There is then determined a value at which the sum approximates a value that has been calculated according to an arbitrary interpolation formula from a value produced by supplying data of the digital signal which precede and follow the error portion to the digital filter. Interpolation data is now obtained which correspond to the determined value. In this manner, the amount of calculations is reduced for well interpolating the digital signal.

Figure 9:
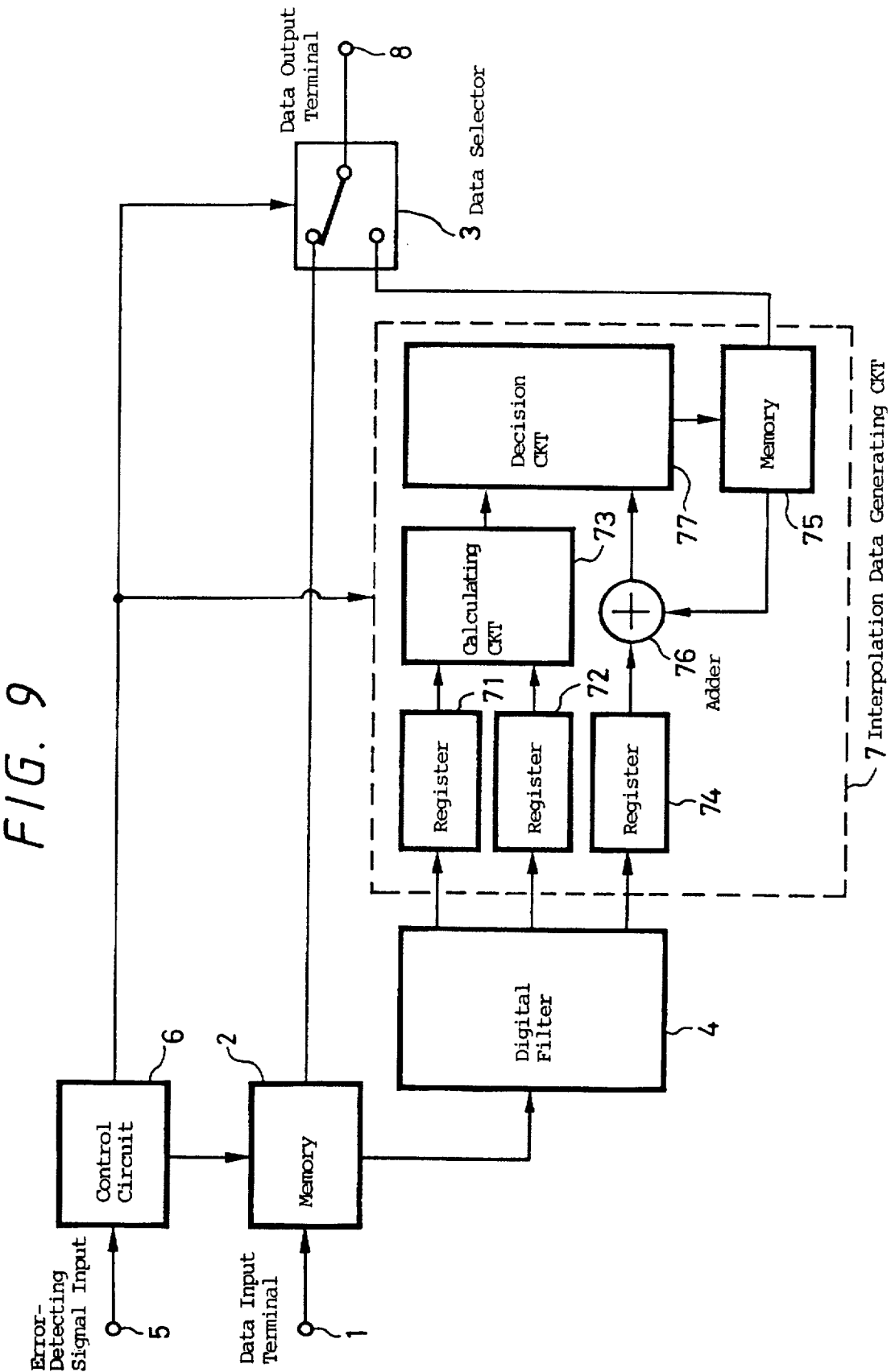
FIG. 9 is a block diagram of an apparatus for interpolating a digital signal according to the first embodiment of the present invention.

The above process may be carried out by an arrangement as shown in FIG. 9. As shown in FIG. 9, a digital audio signal inputted from a data input terminal 1 is supplied through a memory 2 to a data selector 3. The digital signal from the memory 2 is also supplied to an n-tap FIR low-pass filter having coefficients c0, c1, c2, . . . , cn-1.

An error-detecting signal indicative of whether the digital audio signal supplied to the data input terminal 1 is correct or not is supplied to an error-correcting signal input terminal 5. The error-detecting signal is supplied from an error-detecting circuit (not shown). The error-detecting circuit detects whether an error has occurred or not when it decodes an error-detecting code or an error-correcting code which is added to the digital audio signal supplied to the data input terminal 1. The error-detecting signal supplied to the error-correcting signal input terminal 5 is supplied to a control circuit 6. The control circuit 6 supplies a control signal to the memory 2, the data selector 3, and an interpolation data generating circuit 7 (described later on).

When an error is detected in the digital audio signal supplied to the data input terminal 1 and an error-detecting signal is supplied to the error-correcting signal input terminal 5, the control circuit 6 supplies a control signal to the memory 2, from which data preceding the data which have suffered the error are read and supplied to a digital filter 4. The digital filter 4 extracts a value A preceding the data which have suffered the error. The value A is held by a register 71 of the interpolation data generating circuit 7.

Then, the control circuit 6 supplies a control signal to the memory 2, from which data following the data which have suffered the error are read and supplied to the digital filter 4. The value B is held by a register 72 of the interpolation data generating circuit 7. Using the values A, B, the equation (2) is calculated by a calculating circuit 73, producing a value Y0.

The control signal from the control circuit 6 is supplied to the memory 2, from which data preceding and following the data which have suffered the error, as shown in FIG. 8, are read and supplied to the digital filter 4. Since the above error is not generated, the value of a term A0 capable of filter calculations is extracted from the digital filter 4, and held by a register 74 of the interpolation data generating circuit 7.

A memory 75 of the interpolation data generating circuit 7 holds the values of terms Bn incapable of filter calculations due to the error. The values of terms Bn are successively read from the memory 75 and supplied to an adder 76, which adds the supplied values of terms Bn to the value of the term A0. The value of the sum is supplied to a decision circuit 77, which compares the supplied value of the sum with the value Y0 from the calculating circuit 73, and decides a value of Bn at which the supplied value of the sum is closest to the value Y0. Interpolation data are produced according to the decided value of Bn.

The values of Bn are calculated in advance based on the configuration of the digital filter 4 that is used or the filter coefficients and the position where an error is established, and are stored in a table. The interpolation data generating circuit 7 which is functionally shown as a block in FIG. 9 is actually implemented by software.

The interpolation data from the interpolation data generating circuit 7 is supplied to the data selector 3. The data selector 3 is controlled by the control signal from the control circuit 6. During an interval in which an error-detecting signal is supplied to the error-detecting signal input terminal 5, the data selector 3 selects the interpolation data from the interpolation data generating circuit 7 and delivers the interpolation data to a data output terminal 8.

The apparatus shown in FIG. 9 is supplied with a digital signal which has been digitized in an arbitrary small number of bits and contains an error portion, and produces interpolation data of the error portion using a value produced by supplying the data of the digital signal, in which the error portion is at an arbitrary position and from which the error portion is removed, to an arbitrary digital filter, and also a value produced by supplying all interpolation data, which the error portion can have, to an arbitrary position of the digital filter. As a result, it is possible to obtain interpolation data approximating the original data, thereby well interpolating the digital signal.

In the method according to the first embodiment described above, if the number of lost data is small, e.g., 4 in the illustrated example, then the number of data calculated is also small, i.e., 16. However, if the length of an error increases, then the amount of calculations needed increases by a factor of the square of the length of the error. Accordingly, this method is not suitable for calculating the values of all combinations of Bn+A0 thoroughly to determine a minimum value.

In a method according to a second embodiment of the present invention, possible 16 values of B0–B15 are rearranged in order of magnitude as B'0–B'15, and they are approximated to a straight line (interpolating straight line) having a gradient of "p" and a y-intercept of "q", using the method of least squares or the like.

Specifically, the approximate straight line is expressed by:

$$B' = px + q$$

and substituted in Bn of the equation (4), producing:

$$px + q + A0 = Y0.$$

Therefore, $$x = (Y0 - A0 - q)/p. \text{ RE} \tag{5}$$

Lost data can be determined from the value of an integer which is closest to the solution to the equation (5).

An example which employs the same FIRZ filter as described above with respect to the this method will be described below.

First, the terms Bn are rearranged in order of magnitude as follows:

$$B'0 = B0 = 1331$$

$$B'1 = B1 = 701$$

$$B'2 = B2 = 659$$

$$B'3 = B8 = 659$$

$$B'4 = B4 = 643$$

$$B'5 = B3 = 29$$

$$B'6 = B9 = 29$$

$$B'7 = B5 = 13$$

$$B'8 = B10 = -13$$

$$B'9 = B6 = -29$$

$$B'10 = B12 = -29$$

$$B'12 = B11 = -643$$

$$B'12 = B7 = -659$$

$$B'13 = B13 = -659$$

$$B'14 = B14 = -701$$

$$B'15 = B15 = -1331$$

Figure 10:
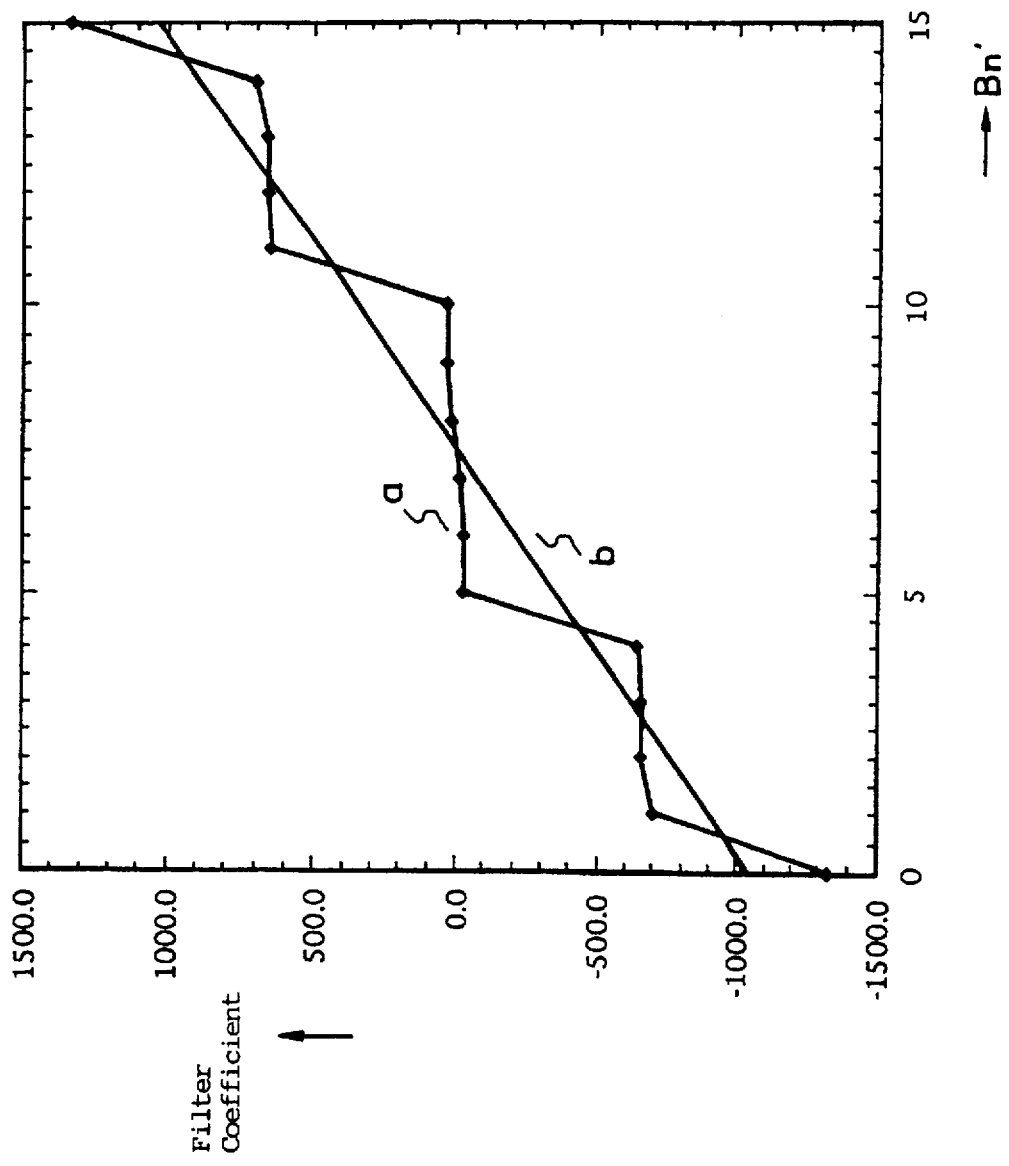
FIG. 10 is a diagram illustrative of a method of interpolating a digital signal according to a second embodiment of the present invention.

A polygonal curve of B' is shown at "a" in FIG. 10. When the polygonal curve is approximated to a straight line using the method of least squares, the straight line is expressed shown at "b" in FIG. 10 which is indicated by:

B'=138.25x−1036.9.

Therefore, p=138.25 and q=−1036.9. The values of "p", "q" are calculated in advance based on the configuration (coefficients) of the digital filter 4 that is used and the position where an error portion is established.

From the values of A0=−3.0 and Y0=6.9, using the equation (5), x=(6.9+3.0+1036.9)/138.25=7.56.

From B'(7.56)→B'(8)=B(10),

B10: (b0=1, b1=−1, b2=1, b3=−1)

is finally obtained.

The above process will be described below with reference to FIG. 10. A point of intersection between the straight line "b" in FIG. 10 which has been obtained using the method of least squares and a 0 level is determined, and a value corresponding or closest to a point on the horizontal axis of FIG. 10 which corresponds to the point of intersection between the straight line "b" and the 0 level is determined as interpolation data. The determined interpolation data is inserted in or replace a portion of the digital signal where the error has occurred, thereby interpolating the digital signal. The interpolation data corresponding to the point on the horizontal axis of FIG. 10 may be determined using a conversion table.

In this example, an FIR filter having a short tap length has been employed for the sake of brevity, and hence the result differs from the result of the former method. However, the results of the two methods can be brought into agreement with each other in most cases by increasing the tape length of the FIR filter for higher calculation accuracy.

In the method according to the second embodiment, as described above, a graph is determined which approximates a value produced by supplying all interpolation data, which an error portion can have, to an arbitrary position of the digital filter. A value which approximates a point of intersection between the determined graph and a 0 level is then determined, and interpolation data corresponding to the determined value is obtained. In this manner, the amount of calculations needed is further reduced for well interpolating the digital signal.

Figure 11:
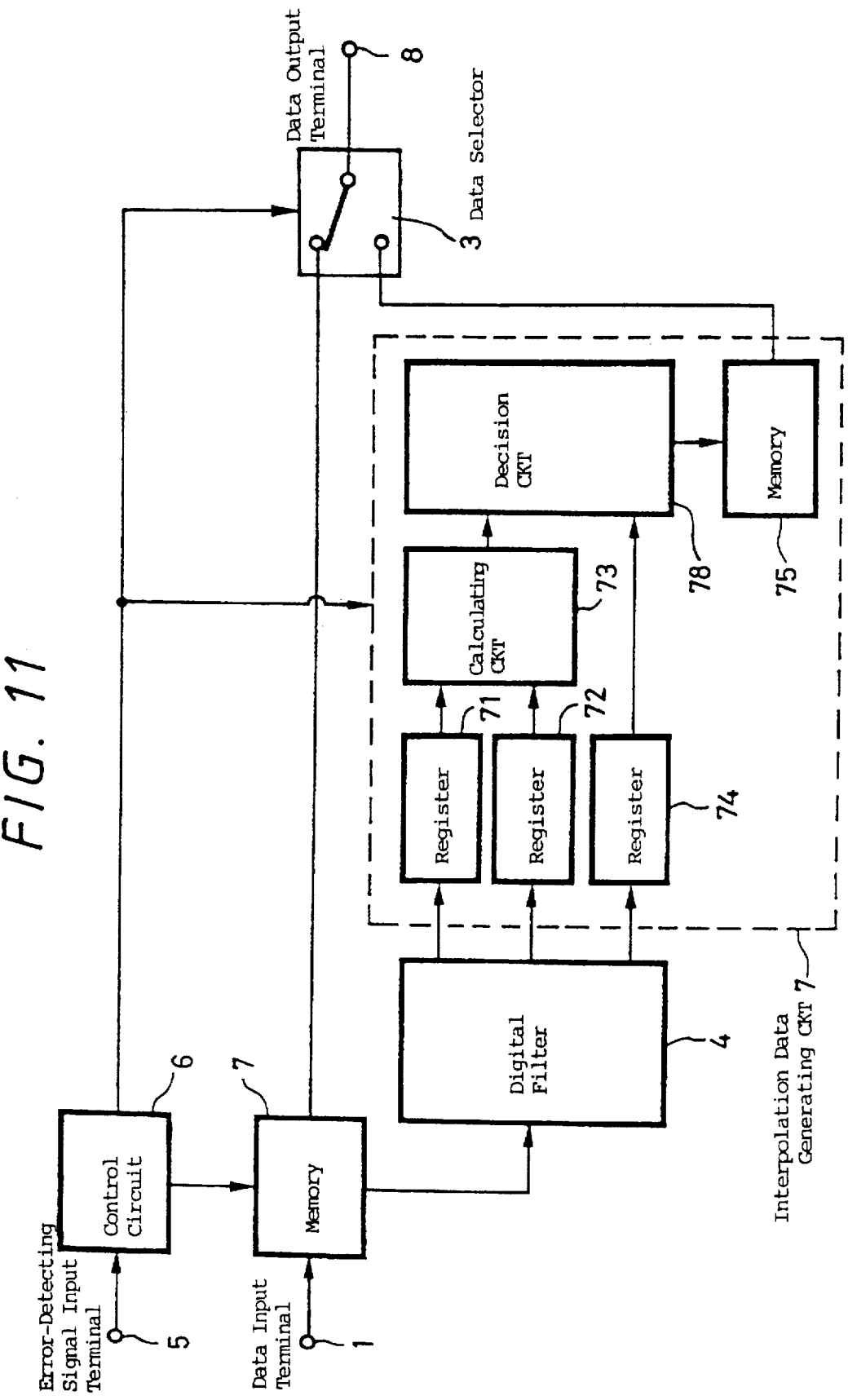
FIG. 11 is a block diagram of an apparatus for interpolating a digital signal according to the second embodiment of the present invention.

The method according to the second embodiment may be carried out by an arrangement as shown in FIG. 11. Those parts shown in FIG. 11 which are identical to those shown in FIG. 9 are denoted by identical reference numerals, and will not be described in detail below. As shown in FIG. 11, a value Y0 from the calculating circuit 73 of the interpolation data generating circuit 7 and a value of A0 held by the register 74 are supplied to a calculating circuit 78 which calculates the equation (5), for thereby calculating B' described above. A value Bn closest to B' is decided, and interpolation data is produced according to the decided value Bn.

The interpolation data generated by the calculating circuit 78 of the interpolation data generating circuit 7 are supplied to the data selector 3. As with the arrangement shown in FIG. 9, during an interval in which an error-detecting signal is supplied to the error-detecting signal input terminal 5, the data selector 3 selects the interpolation data from the interpolation data generating circuit 7 based on the control signal from the control circuit 6. As a result, data output terminal 8 outputs data in which the interpolation data from the interpolation data generating circuit 7 has replaced or been inserted in the error portion.

A method according to a third embodiment of the present invention is an application of the method according to the first embodiment, and dispenses with the calculation of Yn according to the equation (2). Specifically, since Y0, Y1, Y2, ... are linearly interpolated, their differences are constant as follows:

Y0−Y1=Y1−Y2=k.

If it is assumed that

Y0−Y1=(c0−c1)*b0+(c1−c2)*b1+(c2−c3)*b2+(c3−c4)*b3+A0−A1=k, and

C0=c0−c1,

A'0=A0−A1, then the following equation is satisfied:

$$C0*b0+C1*b1+C2*b2+C3*b3+A'0=k. \quad (6)$$

The equation (6) may be considered as an FIR filter which comprises a differential filter whose coefficients are represented by the differences between the coefficients of the original low-pass filter that are shifted by one coefficient position. Since Y0, Y1, Y2, ... are linearly interpolated, the coefficients of the original low-pass filter may not be shifted by one coefficient position, but may be shifted by ½ of the tap length of the original FIR filter.

Figure 13:
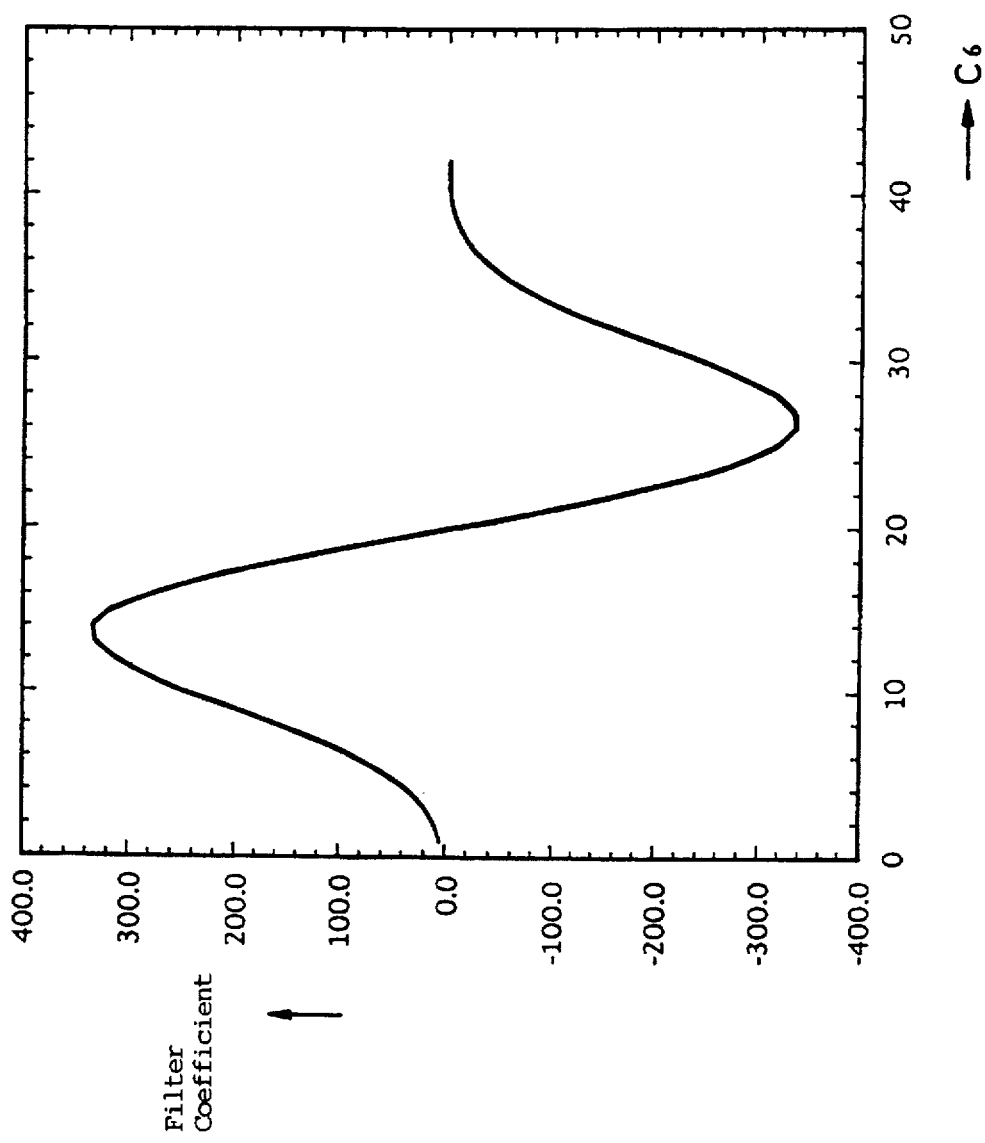
FIG. 13 is a diagram illustrative of the method of interpolating a digital signal according to the third embodiment of the present invention.

An example of the coefficients of the differential filter is illustrated in Table 3 shown in FIG. 12 and FIG. 13.

Figure 14:
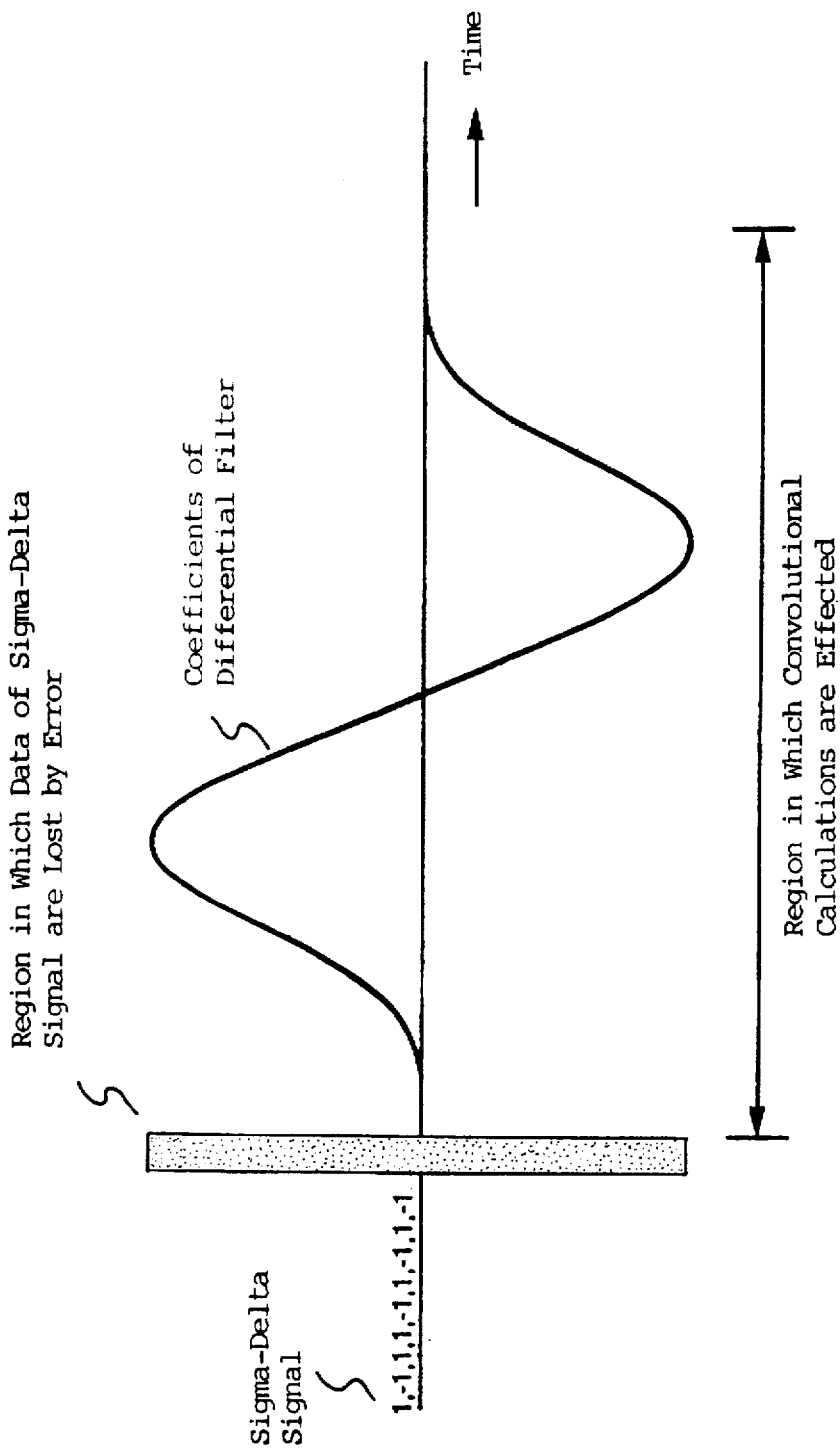
FIG. 14 is a diagram illustrative of the method of interpolating a digital signal according to the third embodiment of the present invention.

The equation (6) is of the same configuration as the equation (3). It is possible to calculate A'0 using the differential filter shown in Table 3 instead of the FIR filter shown in Table 1, and to determine "k" by calculating the differential filter in the vicinity of an error region as shown in FIG. 14.

As with the interpolation using the above FIR filter, data suffering an error can be interpolated according to:

$$x=(k-A'0-q)/p. \quad (7)$$

In the method according to the third embodiment, it is not necessary to calculate Yn according to the equation (2).

In the method according to the third embodiment, a differential digital filter whose coefficients are represented by the differences between the coefficients of an original filter that are shifted by an arbitrary tap length is used thereby to further reduce the amount of calculations for well interpolating the digital signal.

Figure 15:
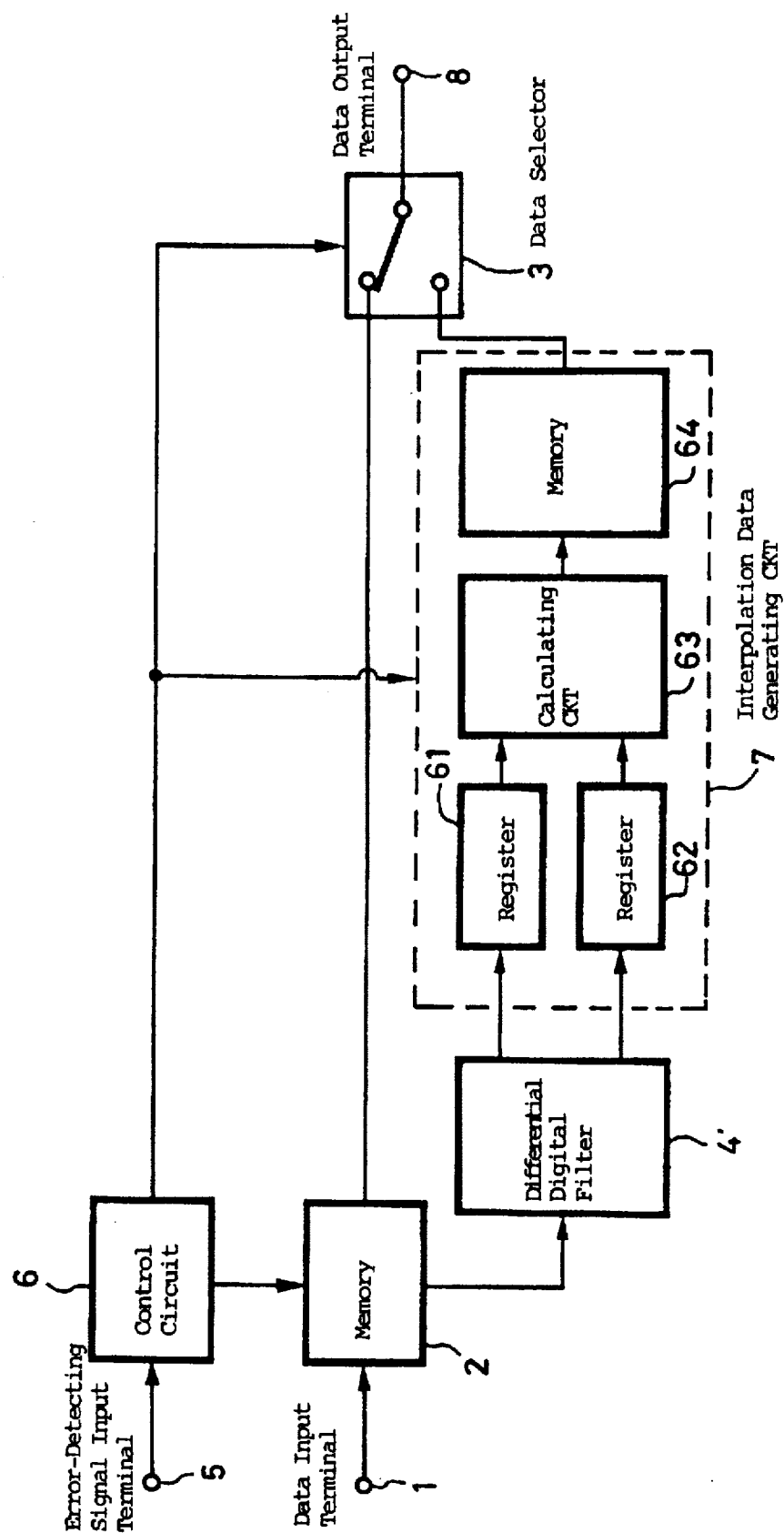
FIG. 15 is a block diagram illustrative of an apparatus for interpolating a digital signal according to the third embodiment of the present invention.

The method according to the third embodiment may be carried out by an arrangement as shown in FIG. 15. Those parts shown in FIG. 15 which are identical to those shown in FIG. 9 are denoted by identical reference numerals, and will not be described in detail below. As shown in FIG. 15, a data signal from the memory 2 is supplied to a differential digital filter 4' having coefficients C0, ..., C40.

If an error is detected in a digital signal supplied to the data input terminal 1 and an error-detecting signal is supplied to the error-correcting signal input terminal 5, the control circuit 6 supplies a control signal to the memory 2, from which data in the vicinity of the data that has suffered the error is read and supplied to the differential digital filter 4'. The differential digital filter 4' extracts a value of "k"

described above, which is then held by a register 61 of an interpolation data generating circuit 7.

The control signal from the control circuit 6 is supplied to the memory 2, from which data preceding and following the data that has suffered the error are read and supplied to the differential digital filter 4'. The differential digital filter 4' extracts a value of A'0 described above, which is held by a register 62 of the interpolation data generating circuit 7.

The value of "k" from the register 61 and the value of A'0 from the register 62 are supplied to a calculating circuit 63, which calculates a value of "x" according to the equation (7). A value of Bn which is closest to the value of "x" is decided, and the decided value of Bn is supplied to a memory 64, for thereby generating interpolation data. During an interval in which the error-detecting signal is supplied to the error-detecting signal input terminal 5, the interpolation data generated by the interpolation data generating circuit 7 are selected by the data selector 3, and outputted from the output terminal 8.

The values of Bn are calculated in advance based on the configuration (coefficients) of the differential digital filter 4' that is used and the position where an error is established, and are stored in a table. The interpolation data generating circuit 7 which is functionally shown as a block in FIG. 15 may be implemented by software.

The apparatus shown in FIG. 15 employs a differential digital filter whose coefficients are represented by the differences between the coefficients of an original filter that are shifted by an arbitrary tap length thereby to further reduce the amount of calculations for well interpolating the digital signal.

Figure 16:
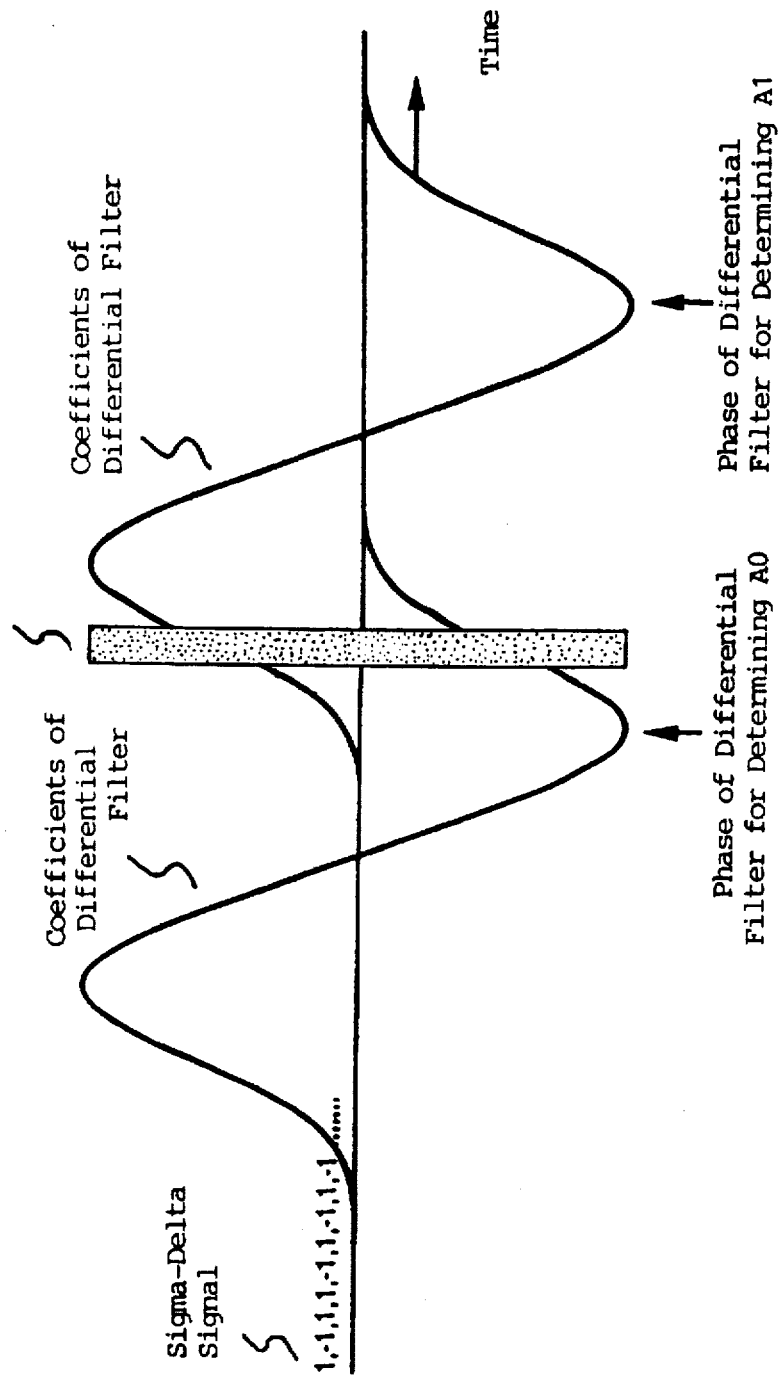
FIG. 16 is a diagram illustrative of a method of interpolating a digital signal according to a fourth embodiment of the present invention.

A method according to a fourth embodiment of the present invention effects calculations for interpolation, as described below, so that a value of "k" will not be calculated. Since the differential coefficient filter illustrated in the example is of a configuration of point symmetry, the same interpolating process as with the method according to the third embodiment is carried out at two positions in point symmetry as shown in FIG. 16.

If an interpolating straight line has a gradient of "p" and a y-intercept of "q", then another interpolating straight line has a gradient of "−p" and a y-intercept of "−q". From the respective straight lines are obtained:

$$x=(k-A'0-q)/p, \text{ and}$$

$$x=(k-A'1+q)/(-p)$$

as with the equation (7). By eliminating "k" from the above equations, the following equation is obtained:

$$x=(A'1-A'0-2q)/2p. \qquad (8)$$

Figure 17:
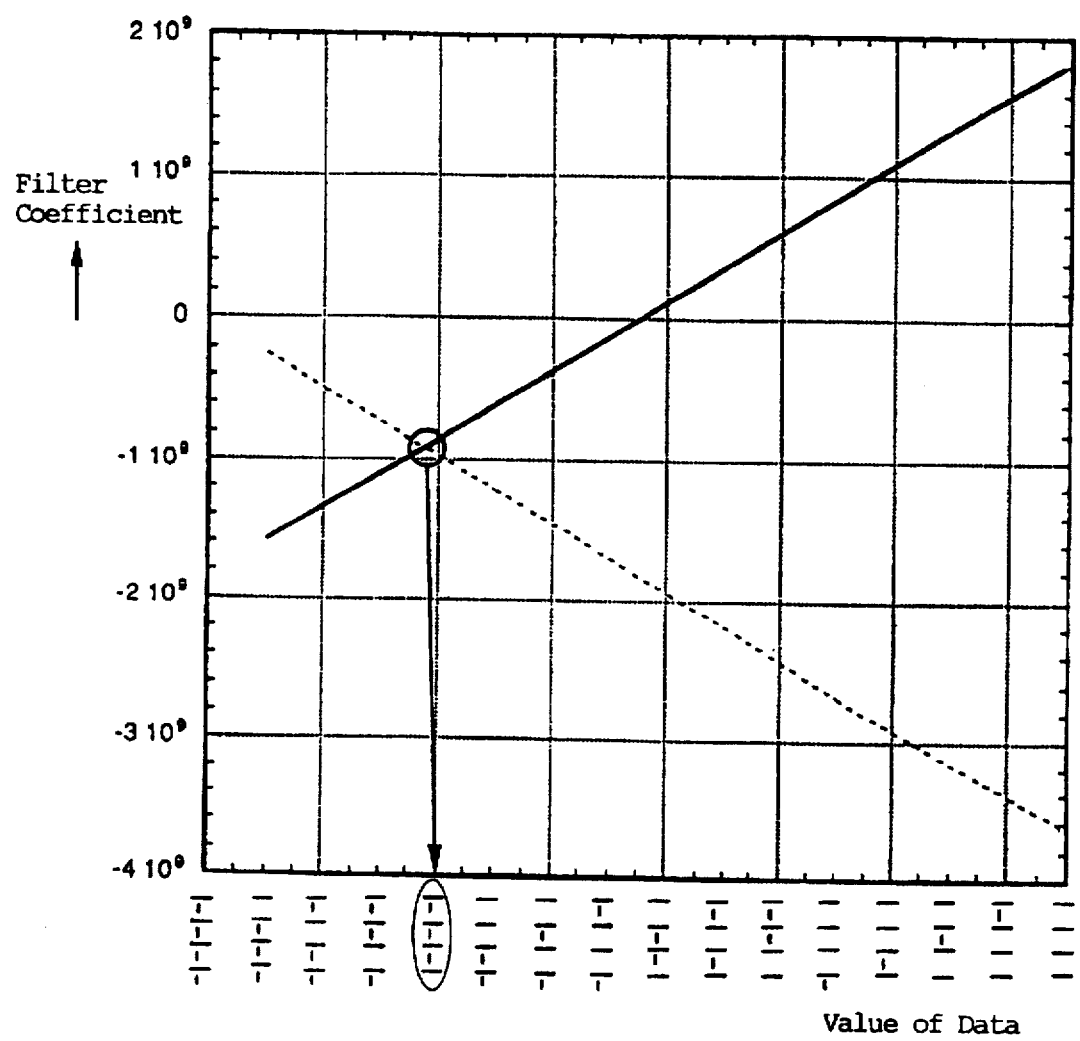
FIG. 17 is a diagram illustrative of the method of interpolating a digital signal according to the fourth embodiment of the present invention.

As shown in FIG. 17, data lost by an error is estimated from a point of intersection between these two estimated straight lines, and data closest to the estimated data is outputted as interpolation data.

In the method according to the fourth embodiment, a graph is determined which approximates a value produced by supplying all interpolation data, which an error portion can have, to an arbitrary position of the differential digital filter, and a first graph is determined by substituting, in the graph, a value produced by supplying the data of the digital signal, in which the error portion is at an arbitrary position and from which the error portion is removed, to the differential digital filter. Furthermore, a graph is determined which approximates a value produced by supplying all interpolation data, which an error portion can have, to a position of point symmetry of the differential digital filter at an arbitrary position of the differential digital filter, and a second graph is determined by substituting, in the graph, a value produced by supplying the data of the digital signal, in which the error portion is at a position of point symmetry of the differential digital filter at an arbitrary position and from which the error portion is removed, to the differential digital filter. A value which approximates a point of intersection between the first and second graphs is decided, and interpolation data corresponding to the decided value is obtained. In this manner, the amount of calculations needed is further reduced for properly interpolating the digital signal.

The method according to the fourth embodiment may be carried out by an arrangement which is the same as the arrangement shown in FIG. 15, for example. Specifically, if an error is detected in a digital signal supplied to the data input terminal 1 and an error-detecting signal is supplied to the error-correcting signal input terminal 5, the control circuit 6 supplies a control signal to memory 2, from which data preceding and following the data are read in a phase to determine A'1 shown in FIG. 16, for example, and supplied to the differential digital filter 4'. The differential digital filter 4' extracts a value of A'1 described above, which is then held by the register 61 of the interpolation data generating circuit 7.

The control signal from the control circuit 6 is supplied to the memory 2, from which data preceding and following the data is read in a phase to determine A'0 shown in FIG. 16, for example, and supplied to the differential digital filter 4'. The differential digital filter 4' extracts a value of A'0 described above, which is held by the register 62 of the interpolation data generating circuit 7.

The value of A'1 from the register 61 and the value of A'0 from the register 62 are supplied to the calculating circuit 63, which calculates a value of "x" according to the equation (8). A value of Bn which is closest to the value of "x" is decided, and the decided value of Bn is supplied to the memory 64, for thereby generating interpolation data. During an interval in which the error-detecting signal is supplied to the error-detecting signal input terminal 5, the interpolation data generated by the interpolation data generating circuit 7 is selected by the data selector 3, and outputted from the output terminal 8.

The above apparatus determines a graph which approximates a value produced by supplying all interpolation data, which an error portion can have, to an arbitrary position of the differential digital filter, a first graph by substituting, in the graph, a value produced by supplying the data of the digital signal, in which the error portion is at an arbitrary position and from which the error portion is removed, to the differential digital filter, and furthermore, a graph which approximates a value produced by supplying all interpolation data, which an error portion can have, to a position of point symmetry of the differential digital filter at an arbitrary position of the differential digital filter, and a second graph by substituting, in the graph, a value produced by supplying the data of the digital signal, in which the error portion is at a position of point symmetry of the differential digital filter at an arbitrary position and from which the error portion is removed, to the differential digital filter. The apparatus then decides a value which approximates a point of intersection between the first and second graphs, and obtains interpolation data corresponding to the decided value. In this manner, the apparatus can reduce the amount of calculations needed for properly interpolating the digital signal.

In any of the methods according to the equations (5), (7), and (8) described above, as many equations can be established as the tap length of the filter depending on the phase of the filter using a region suffering an error, in which filter calculations are to be carried out. After solutions are determined from a plurality of equations, a more probable interpolated value can be determined using the principle of a majority decision.

In the above description, the length of data which are lost by an error is of 4 bits. According to this method, however, insofar as an interpolating straight Line is determined in advance depending on the length of an error, it is possible to interpolate error data with almost the same amount of calculations.

The digital filter which has low-pass filter characteristics is capable of interpolating digital signals in a manner to better match the hearing sensation.

Actual examples of interpolation with respect to a sine wave having a sampling frequency of 2.822 MHz, a signal frequency of 1 kHz, and an amplitude which is of −50 dB from the full scale are shown in FIGS. 18–21. The filter used in these examples is an FIR low-pass filter comprising an average moving filter with 64 taps in four overlapping stages.

Figure 18:
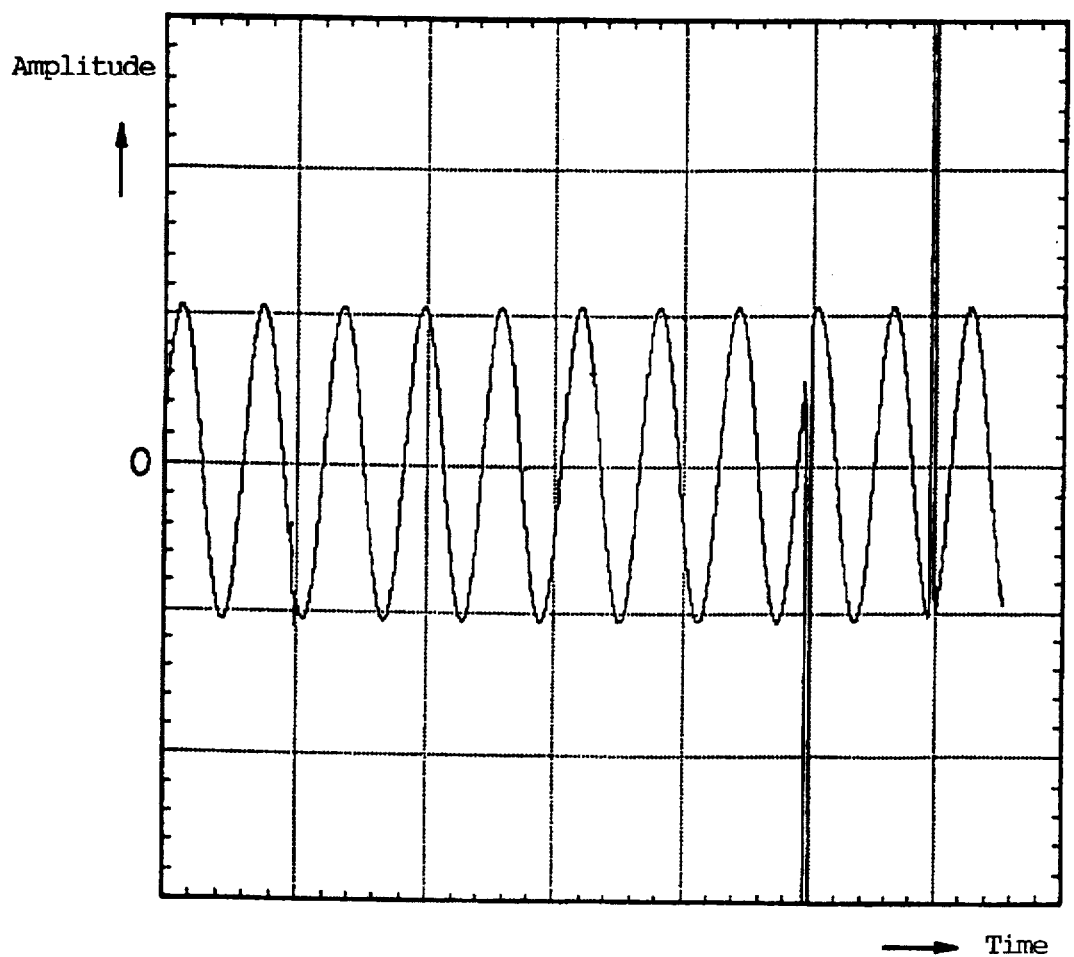
FIG. 18 is a diagram showing a waveform of a 1-bit $\Sigma\Delta$ signal corrected by holding data which precede a 4-bit error that has occurred to the 1-bit $\Sigma\Delta$ signal.

FIG. 18 shows a waveform of a 1-bit $\Sigma\Delta$ signal corrected by holding data which precede a 4-bit error that has occurred to the 1-bit $\Sigma\Delta$ signal.

Figure 19:
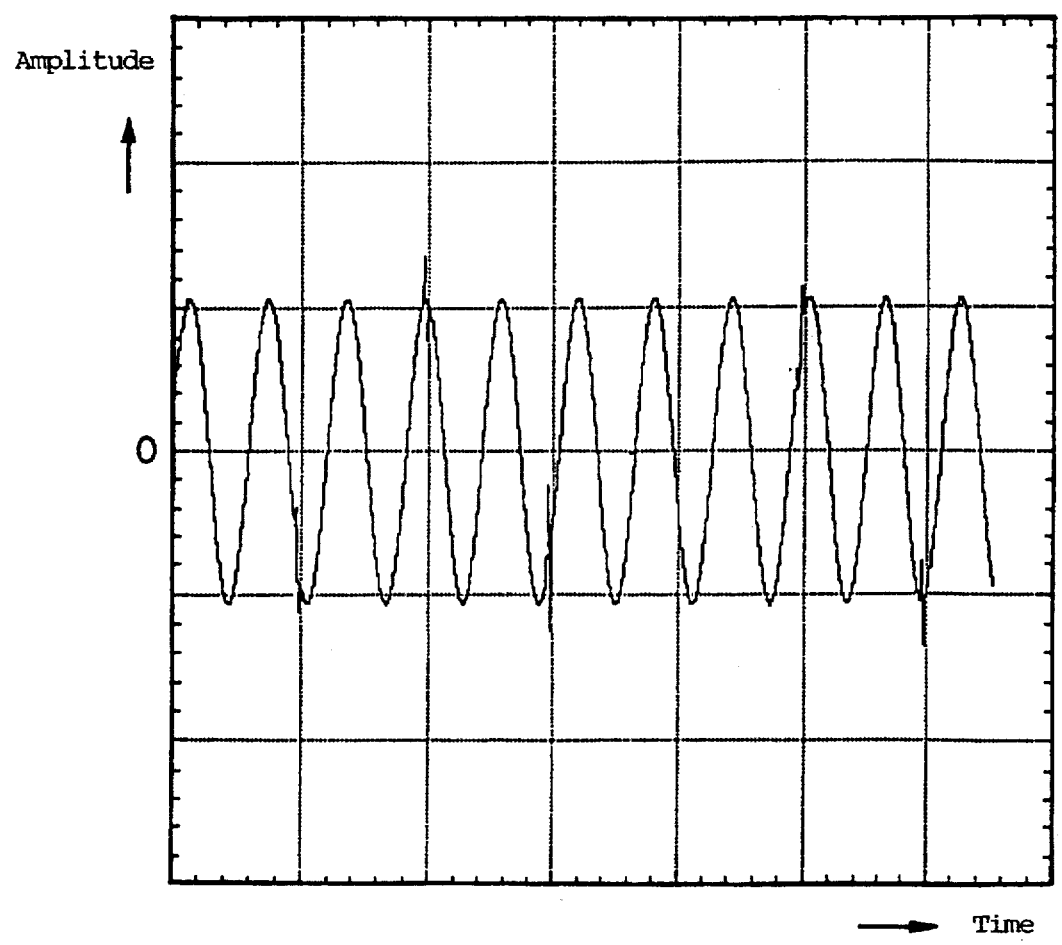
FIG. 19 is a diagram showing a waveform of a 1-bit signal corrected by an interpolation process according to the present invention after a 4-bit error has occurred to the 1-bit $\Sigma\Delta$ signal.

FIG. 19 shows a waveform of a 1-bit $\Sigma\Delta$ signal corrected by an interpolation process according to the present invention after a 4-bit error has occurred to the 1-bit $\Sigma\Delta$ signal.

Figure 20:
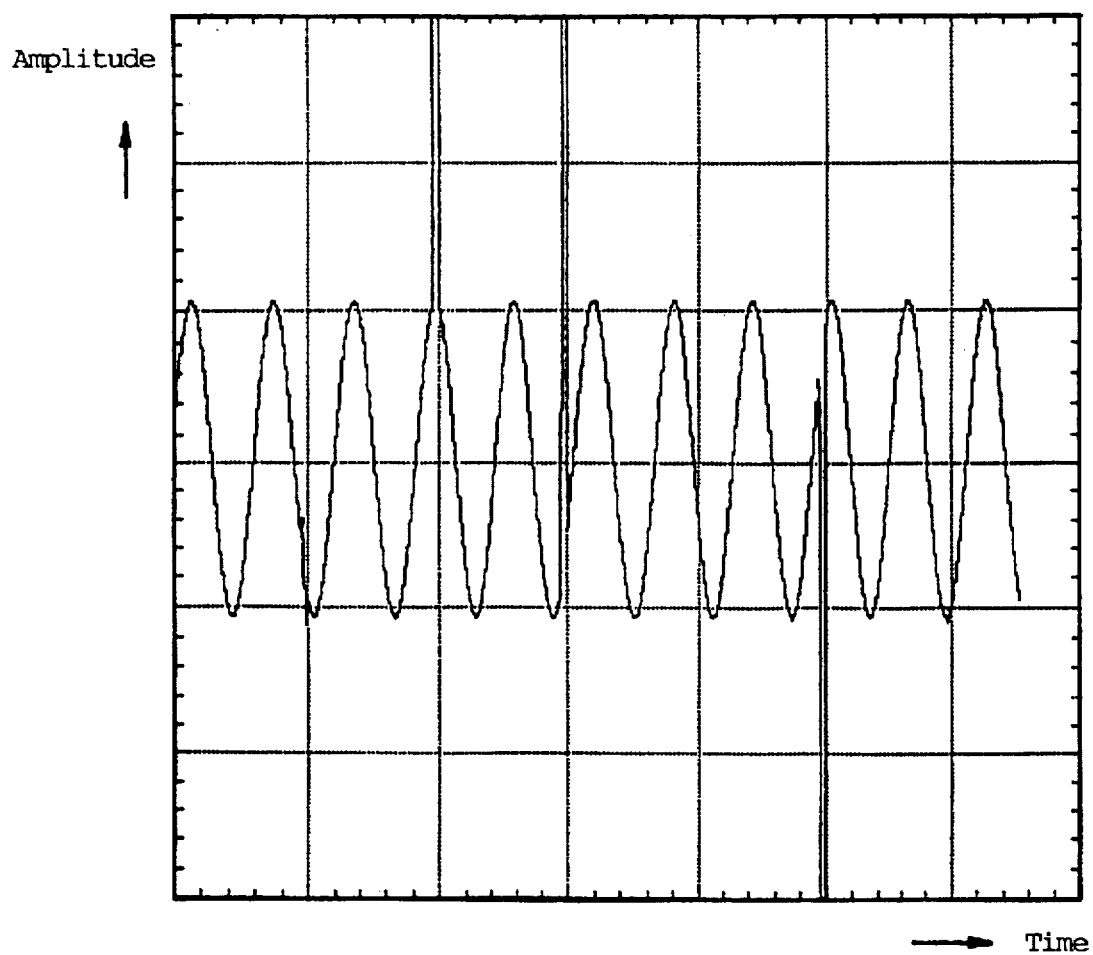
FIG. 20 is a diagram showing a waveform of a 1-bit $\Sigma\Delta$ signal corrected by holding data which precede an 8-bit error that has occurred to the 1-bit $\Sigma\Delta$ signal.

FIG. 20 shows a waveform of a 1-bit $\Sigma\Delta$ signal corrected by holding data which precede an 8-bit error that has occurred to the 1-bit $\Sigma\Delta$ signal.

Figure 21:
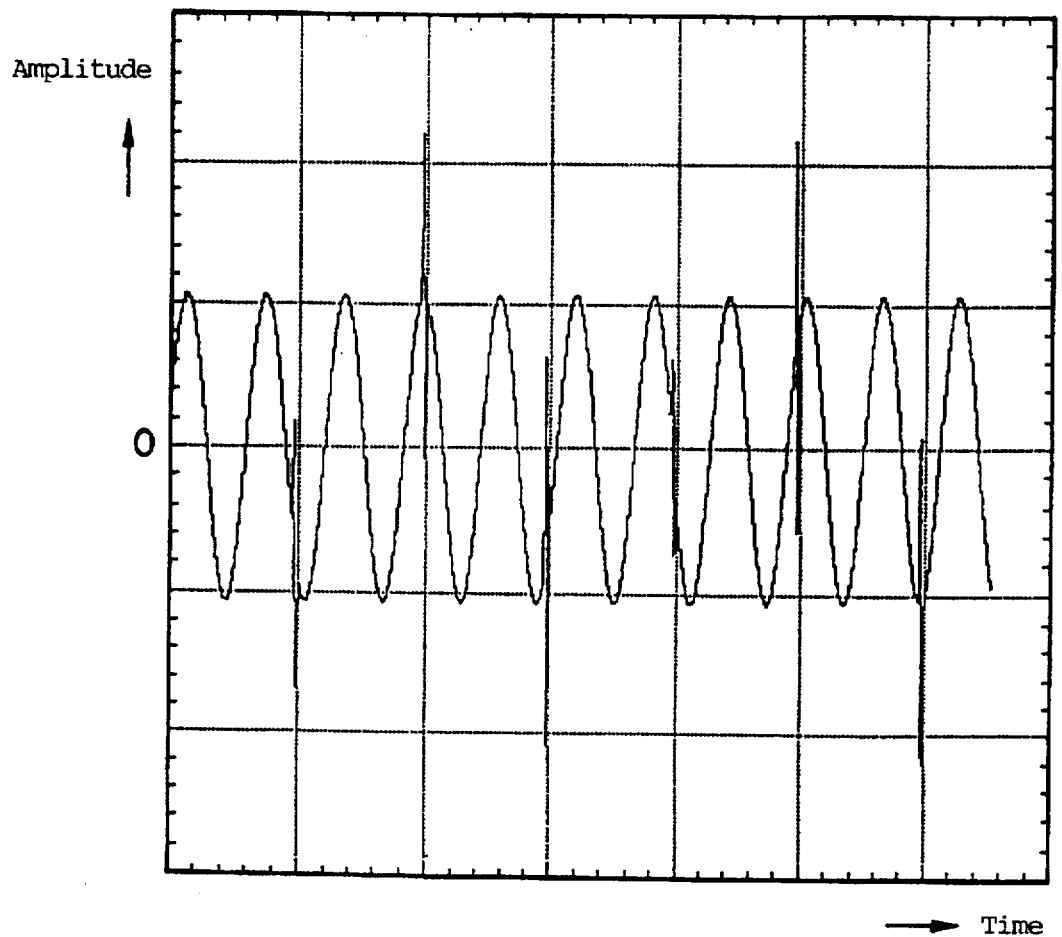
FIG. 21 is a diagram showing a waveform of a 1-bit $\Sigma\Delta$ signal corrected by an interpolation process according to the present invention after an 8-bit error has occurred to the 1-bit $\Sigma\Delta$ signal.

FIG. 21 shows a waveform of a 1-bit $\Sigma\Delta$ signal corrected by an interpolation process according to the present invention after an 8-bit error has occurred to the 1-bit $\Sigma\Delta$ signal.

In these examples, noise of a large level is prevented from being produced according to the present invention.

With the methods and apparatus according to the above embodiments of the present invention, even if a signal portion is lost from a digital audio signal composed of a small number of bits, such as a 1-bit signal produced by $\Sigma\Delta$ modulation, for example, due to a failure of the transmission system, maximum-level noise is prevented from being produced at the lost signal portion.

Accordingly, a digital audio signal composed of a small number of bits, such as a 1-bit signal produced by $\Sigma\Delta$ modulation, for example, can be transmitted (recorded and reproduced) without damage to its characteristics.

A method of interpolating a digital signal according to a fifth embodiment of the present invention will be described below.

In the method according to the fifth embodiment, a $\Sigma\Delta$ signal which has suffered an error is interpolated in the form of a $\Sigma\Delta$ signal to restore data which will present no problems for the listener to hear the reproduced sound. Specifically, a digital signal which has been digitized in an arbitrary small number of bits is divided into digital signals each having a predetermined number of bits, and the probability that the divided digital signals will be generated is determined. Based on the determined probability, an interpolation table required for an interpolation process is generated, and interpolation data of an error portion are produced by referring to the interpolation table.

It is assumed that the data of a 1-bit $\Sigma\Delta$ signal are represented by b(n), b(n+1), b(n+2), b(n+3), b(n+4), . . . , and this signal is divided by 4 bits from an arbitrary position into:

$B0=b(n)*2^3+b(n+1)*2^2+b(n+2)*2+b(n+3)$, and $B1=b(n+4)*2^3+b(n+5)*2^2+b(n+6)*2+b(n+7)$, for example.

If 4 bits of the $\Sigma\Delta$ signal are (0, 1, 1, 0), then it may be expressed by:

$B0=0*2w+1*22+1*2+0=6$ which is calculated according to the hexadecimal notation. In this manner, the above 4-bit $\Sigma\Delta$ signal can be converted into 16 values (symbols) ranging from "0" to "f" according to the hexadecimal representation.

That is, the $\Sigma\Delta$ signal can be expressed by:

0=(0, 0, 0, 0) 8=(1, 0, 0, 0)

1=(0, 0, 0, 1) 9=(1, 0, 0, 1)

2=(0, 0, 1, 0) a=(1, 0, 1, 0)

3=(0, 0, 1, 1) b=(1, 0, 1, 1)

4=(0, 1, 0, 0) c=(1, 1, 0, 0)

5=(0, 1, 0, 1) d=(1, 1, 0, 1)

6=(0, 1, 1, 0) e=(1, 1, 1, 0)

7=(0, 1, 1, 1) f=(1, 1, 1, 1).

An example of hexadecimal representations of the data of a $\Sigma\Delta$ signal produced when an actual music signal is inputted is illustrated in Table 4 shown in FIG. 22.

As can be seen from Table 4, the data of a $\Sigma\Delta$ signal produced when an actual music signal is inputted contain almost no data of "0" and "f", but mostly data of "5", "a", "6", and "c". This is because the $\Sigma\Delta$ signal expresses the original music signal with the density of 1-bit values of "1" and "0", and the data of "0" and "f" correspond to negative and positive maximum levels which do not often appear in the actual music signal.

If the $\Sigma\Delta$ signal represents a music signal, then there appears to be a correlation between symbols of the $\Sigma\Delta$ signal. An examination of the probability that two successive symbols (trains of symbols) will be generated indicates that the symbols have a distribution as illustrated in Table 5 shown in FIG. 23.

Table 5 can be interpreted to indicate the probability of a transition from a certain symbol to a certain symbol. For example, after a symbol "1", a symbol "a" appears with a probability of 50%, and a symbol "c" appears with a probability of 31%.

The application of the above concept to interpolating data which are lost due to noise or an error in a data transmission circuit signifies that if a symbol preceding a lost symbol is known, the lost symbol can be estimated to a certain degree from the transition probability of the known symbol. In the above example, if a symbol preceding a lost symbol is "1", then a symbol which comes after the symbol of "1" is considered to be "a" of a highest probability, and can be used as interpolating data.

Based on the occurrence probability shown in Table 5, an interpolation table can be created by gathering a symbol of a highest probability which are generated immediately after a symbol. With respect to all the symbols having an occurrence probability of "0" in Table 5, "5" and "a" indicative of "0" for the ΣΔ signal may be used as interpolation data. An example of such interpolation data is illustrated in Table 6 shown in FIG. 24.

Figure 25:
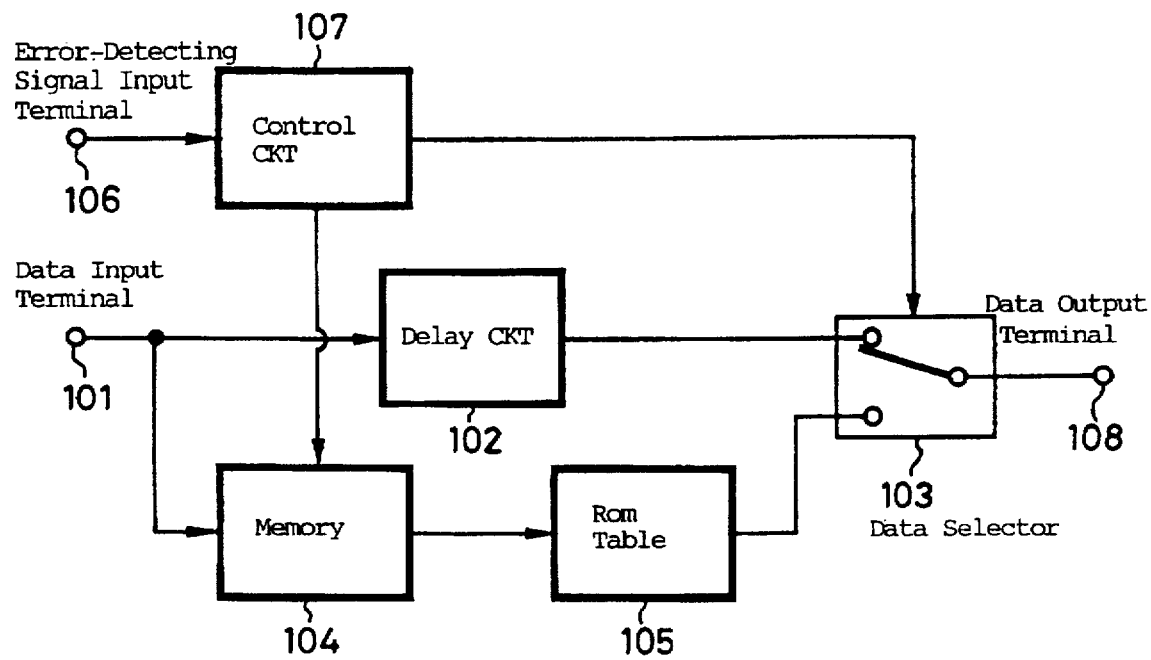
FIG. 25 is a block diagram illustrative of the method of interpolating a digital signal according to the fifth embodiment of the present invention.

In FIG. 25, a digital audio signal supplied to a data input terminal 101 is supplied to a delay circuit 102 having a delay time corresponding to 4 bits of a train of data. A digital signal from the delay circuit 102 is supplied to a data selector 103.

The digital signal from the data input terminal 101 is supplied to a memory 104 which successively stores 4-bit digital signals. The 4-bit digital signals stored in the memory 104 are supplied to a ROM table 105 which contains the interpolation data in Table 6. The digital signals from the ROM table 105 are successively supplied to the data selector 103.

An error-detecting signal indicative of whether the digital audio signal supplied to the data input terminal 101 is correct or not is supplied from an error-detecting circuit (not shown) to an error-correcting signal input terminal 106. The error-detecting circuit detects whether an error has occurred or not based on an error-detecting which is added to the digital audio signal, when it decodes the digital audio signal. The error-detecting signal from the error-correcting signal input terminal 106 is supplied to a control circuit 107. The control circuit 107 supplies a control signal to the data selector 103 and the memory 104.

When an error is detected in the digital audio signal supplied to the data input terminal 101 and an error-detecting signal is supplied to the error-correcting signal input terminal 106, the control circuit 107 supplies a control signal to the memory 104, which holds 4 bits preceding the digital signal which has suffered the error.

The 4 bits are supplied to the ROM table 105, in which the above interpolation table is referred to, generating interpolation data. The interpolation data from the ROM 105 are supplied to the data selector 103, which is controlled by the control signal from the control circuit 107.

Therefore, when an error-detecting signal is supplied to the error-correcting signal input terminal 106, 4 bits preceding the error are held by the memory 104. Then, interpolation data are generated by the ROM table 105 based on the 4 bits, and selected by the data selector 103 and outputted to a data output terminal 108.

Consequently, if an error occurs to a digital signal which has been digitized in an arbitrary small number of bits by ΣΔ modulation or the like, then the apparatus shown in FIG. 25 divides the digital signal into digital signals each having a predetermined number of bits, determines the probability that the divided digital signals will be generated, generates an interpolation table required for an interpolation process based on the determined probability, and produces interpolation data of the error portion by referring to the interpolation table. Therefore, it is possible to obtain interpolation data that are mostly likely to be originally present in the error portion. The digital signal can thus be interpolated very well with a simple arrangement.

The above apparatus for interpolating a digital signal which has been digitized in a given small number of bits has an interpolation table generated based on the occurrence probability of digital signals each having an arbitrary number of bits, divided from a digital signal, means for referring to the interpolation table to obtain interpolation data of an error portion of the digital signal if the digital signal suffers an error, and means for replacing the error portion of the digital signal with the interpolation data obtained from the interpolation table and outputting the digital data. The apparatus is thus of a simple arrangement for interpolating the digital signal very well.

In the above description and the fifth embodiment, interpolation data are determined from 4 bits (1 symbol) preceding an error portion. However, more accurate interpolation data may be obtained by considering data following the error portion as well as the data preceding the error portion. Much more accurate interpolation data may be obtained by taking into consideration data of 8 bits (2 symbols) preceding and following the error portion.

Figure 26:
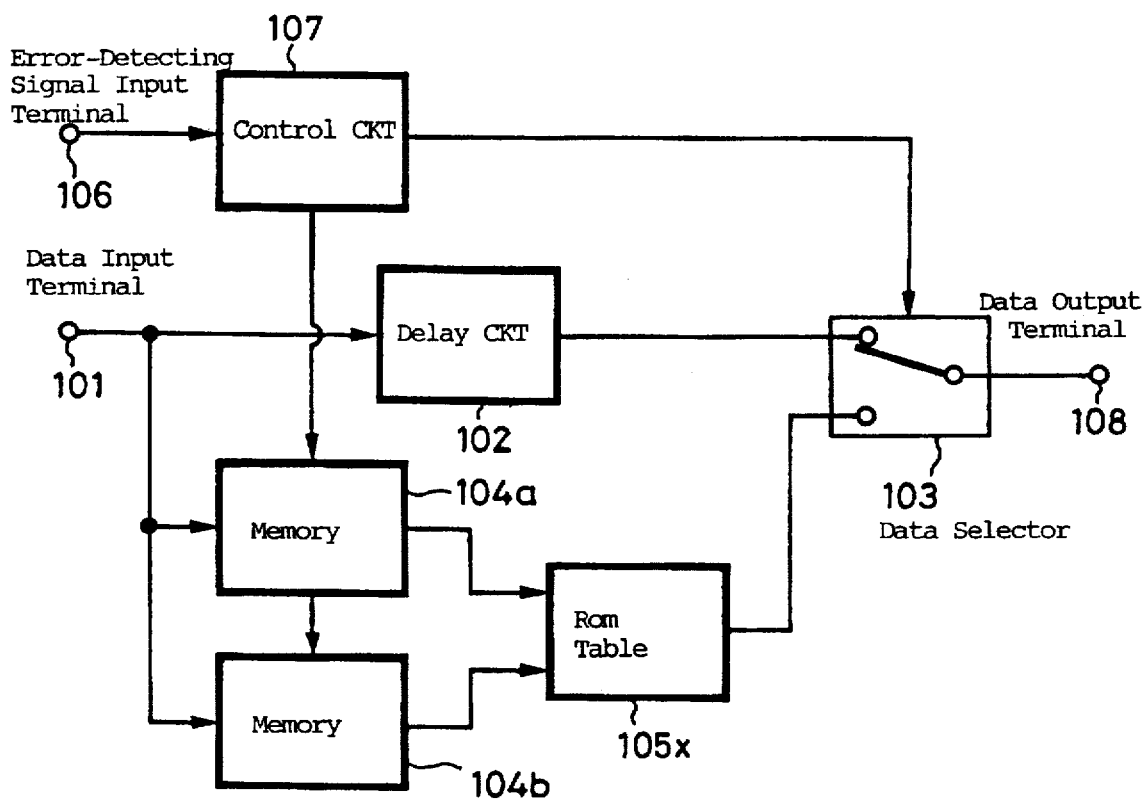
FIG. 26 is a block diagram illustrative of a method of interpolating a digital signal according to a sixth embodiment of the present invention.

FIG. 26 shows an arrangement according to a sixth embodiment for obtaining interpolation data by taking into consideration data of 8 bits (2 symbols) preceding and following the error portion. Those parts shown in FIG. 26 which are identical to those shown in FIG. 25 are denoted by identical reference numerals, and will not be described in detail below.

In FIG. 26, the 4-bit memory 104 shown in FIG. 25 is replaced with two 8-bit memories 104a, 104b. First, the memory 104a is supplied with a control signal from the control circuit 107 for holding 8 bits preceding an error portion. After elapse of a time corresponding to 8 bits after the end of the error portion, the memory 104b is supplied with a control signal from the control circuit 107 for holding 8 bits following the error portion.

A ROM table 105x contains an interpolation table generated from a total of 16 bits including the 8 bits preceding and following the error portion. Interpolation data generated by the ROM table 105x are supplied to the data selector 103, which is controlled by a control signal from the control circuit 107. The delay circuit 102 has a delay time corresponding to 12 bits of a train of data, for example.

In this manner, interpolation data of 4 bits, (1 symbol) can be obtained by considering the data of 8 bits (2 symbols) preceding and following the error portion.

If an interpolation table is created from the train of data (16 bits in total) composed of 8 bits preceding and following the error portion, then the size of the interpolation table is $2^{16}$=65536. Since the interpolation table contains trains of data which are substantially not generated in an actual ΣΔ signal, no table is created for such data trains, but interpolation data of "5" or "a" are given as is the case with the above data of 4 bits, thereby reducing the size of a table used in actual circuits.

Figure 27:
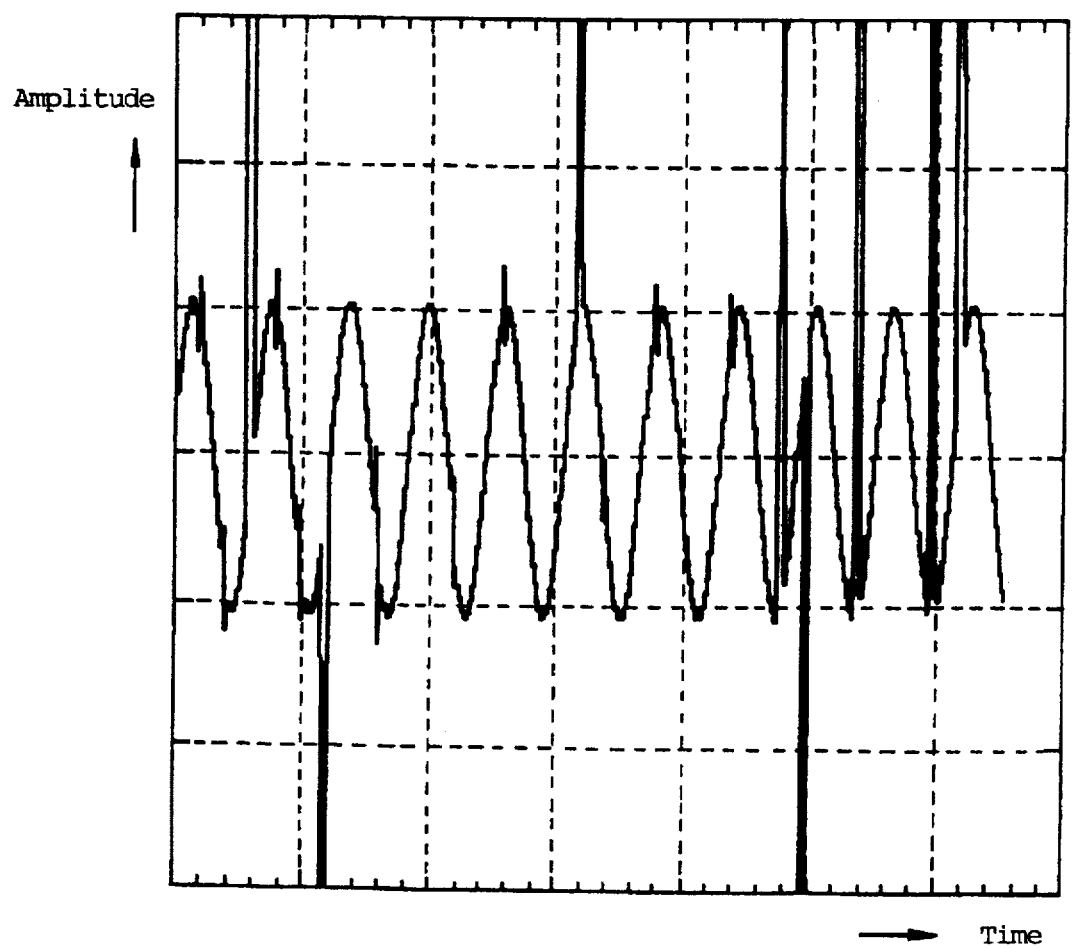
FIG. 27 is a diagram illustrative of the method of interpolating a digital signal according to the sixth embodiment of the present invention.
Figure 28:
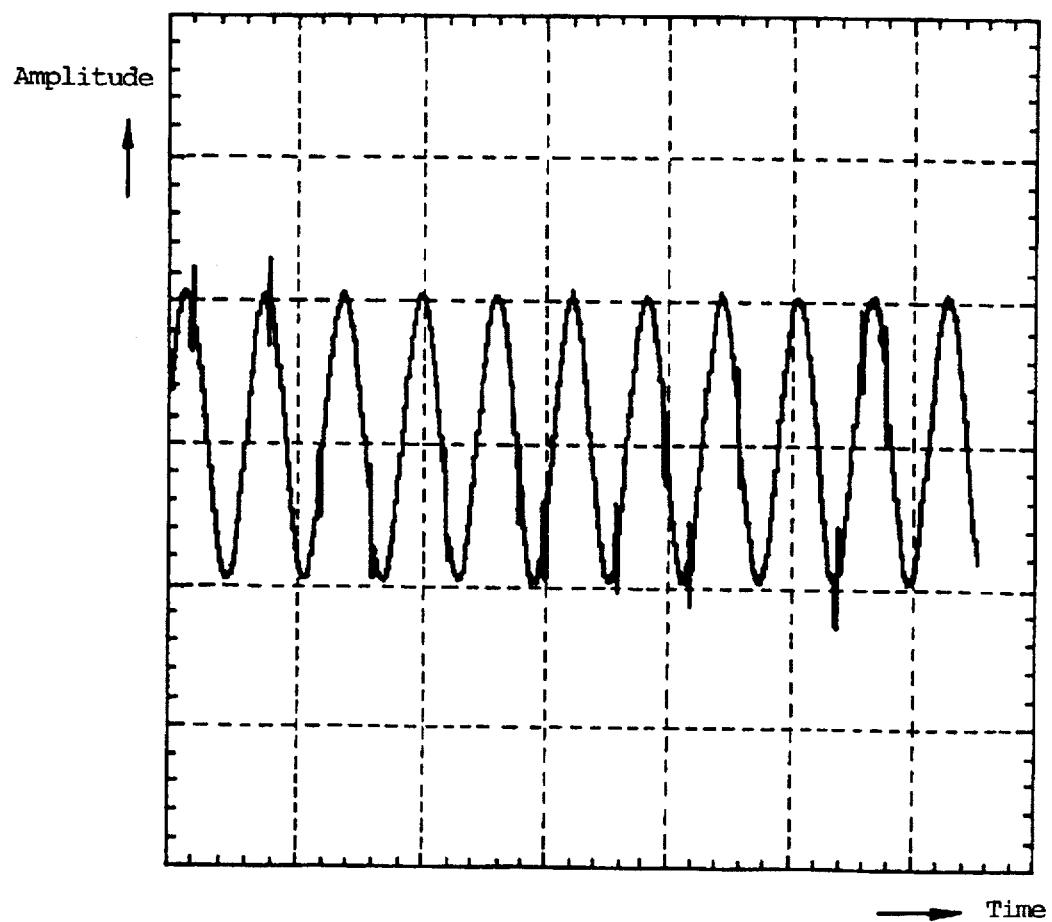
FIG. 28 is a diagram illustrative of the method of interpolating a digital signal according to the sixth embodiment of the present invention.

An example of a waveform which was actually interpolated by the method according to the sixth embodiment is shown in FIG. 28. The signal shown in FIG. 28 represents data of a sine wave sampled at 2.822 MHz with 1 and having an amplitude which is of −50 dB from the full scale, the sine wave being subjected to 4-bit errors at constant intervals. FIG. 27 shows a waveform corrected by the conventional method of holding values preceding the errors. FIG. 28 shows the waveform interpolated using 8 bits preceding and following the errors according to the sixth embodiment of the present invention. A comparison of the waveforms shown in FIGS. 27 and 28 clearly shows that high-level noise is prevented from being produced by the method according to the present invention.

In the above description and the fifth embodiment, 4-bit data are interpolated as a 1 symbol. However, the length of data to be interpolated is not limited to 4 bits, but may be of another value as with the sixth embodiment. Data of a different length can similarly be interpolated by generating an interpolation table corresponding to the different length.

In the above description and the fifth and sixth embodiments, an interpolation table is created based on data of a ΣΔ signal produced when a music signal shown in Table 4 above is inputted. However, different data may possibly be produced when a signal representative of a recorded conversation or the like is inputted. Consequently, interpolation tables corresponding to the respective types of original signals of digital signals may be generated, and may be switched depending on the type of an original signal which is actually inputted. A seventh embodiment directed to such different interpolation tables will be described below with reference to FIG. 29. Those parts shown in FIG. 29 which are identical to those shown in FIG. 25 are denoted by identical reference numerals.

Figure 29:
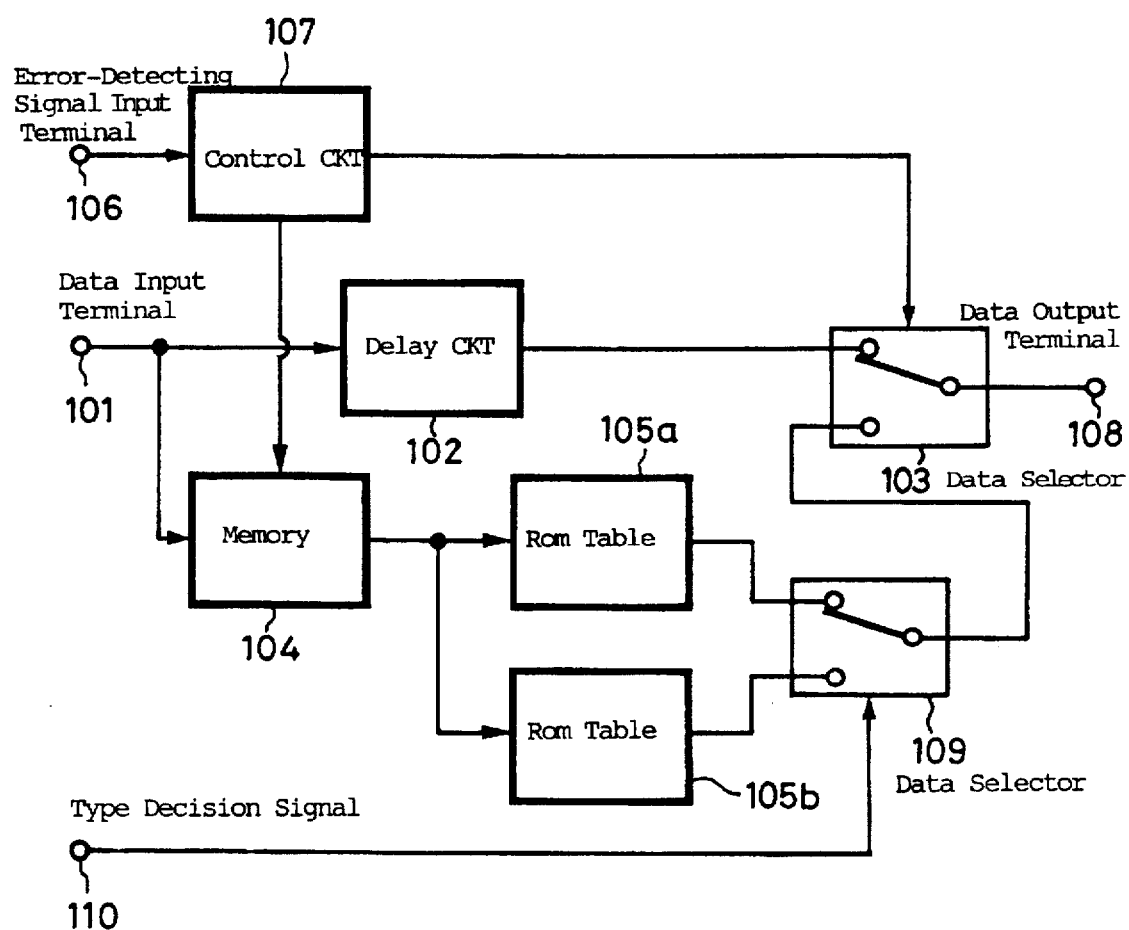
FIG. 29 is a block diagram illustrative of a method of interpolating a digital signal according to a seventh embodiment of the present invention.

In FIG. 29, ROM tables 105a, 105b store interpolation tables generated according to the fifth embodiment based on the data of $\Sigma\Delta$ signals of different types. For example, the ROM tables 105a, 105b store interpolation tables corresponding to digital audio data based on different types of music information such as classical music, jazz, etc.

When an error-detecting signal is inputted to the error-detecting signal input terminal 106, the control circuit 107 controls the memory 104 to store data of a predetermined number of bits, e.g., data of 4 bits, preceding an error in a digital signal. The data stored in the memory 104 are supplied to the ROM tables 105a, 105b. From the data supplied to the ROM tables 105a, 105b, interpolation data are generated based on the interpolation tables stored in the ROM tables 105a, 105b.

The interpolation data outputted from the ROM tables 105a, 105b are supplied to a data selector 109. Based on a type decision signal supplied to an input terminal 110, the data selector 109 selects either the interpolation data outputted from the ROM table 105a or the interpolation data outputted from the ROM table 105b, and supplies the selected interpolation data to the data selector 103.

The digital signal inputted to the input terminal 101 contains additional information indicative of the type of the signal, e.g., information indicative of a music genre such as classical music or jazz, if the digital signal is a digital audio signal. The type decision signal represents a determined result of the information indicative of the type of the signal which is determined by a decision means (not shown).

During an interval in which no error is generated, the output terminal 108 outputs data based on a digital signal delayed by the delay circuit 102. During an interval in which an error is occurring, the output terminal 108 outputs the interpolation data selected by the data selector 109.

With the arrangement shown in FIG. 29, an interpolation table depending on the type of an original signal of a digital signal is selected for producing optimum interpolation data depending on the type of the original signal.

An eighth embodiment of the present invention will be described below with reference to FIG. 30. Those parts shown in FIG. 30 which are identical to those shown in FIG. 25 are denoted by identical reference numerals.

Figure 30:
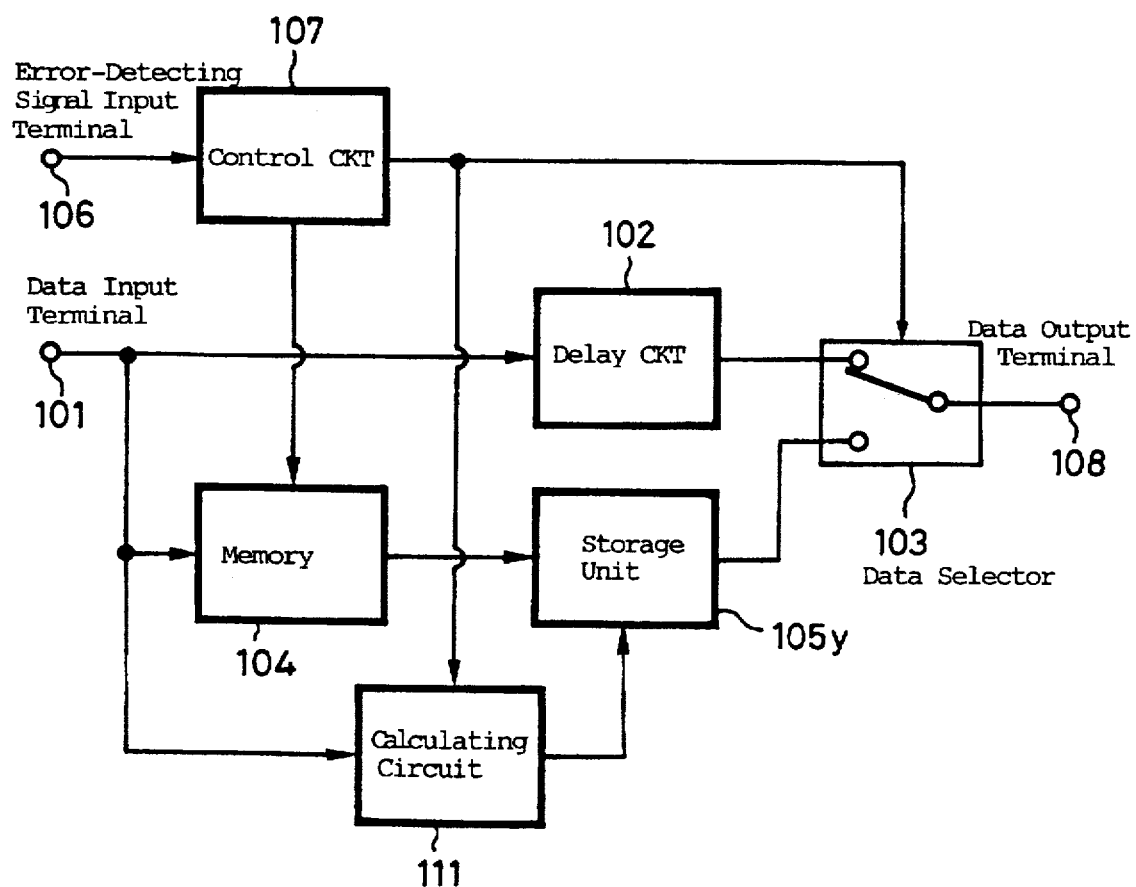
FIG. 30 is a block diagram illustrative of a method of interpolating a digital signal according to an eighth embodiment of the present invention.

According to the eighth embodiment shown in FIG. 30, an interpolation table is generated according to a supplied digital signal. In FIG. 30, a digital signal from the data input terminal 101 is supplied to the delay circuit 102 and the memory 104, and also to a calculating circuit 111 which determines the occurrence probability of the digital signal. According to the occurrence probability, an interpolation table is created and written in a storage unit 105y which comprises a RAM, for example.

In FIG. 30, while an error is not being detected by the error-detecting circuit (not shown), a digital audio signal inputted to the data input terminal 101 is outputted through the delay circuit 102 and the data selector 103 from the data output terminal 108. With no error being detected, a calculating circuit 111 calculates the occurrence probability of the data of the digital audio signal inputted from the data input terminal 101 to generate an interpolation table, based on a control signal from the control circuit 107. The interpolation table is written in the storage unit 105y.

Thereafter, when an error is detected by the error-detecting circuit and an error-detecting signal is supplied through the error-detecting signal input terminal 106 to the control circuit 107, 4-bit data preceding the error, for example, are supplied to the memory 104. The data read from the memory 104 are supplied to the storage unit 105y, and interpolation data are generated based on the interpolation table in the storage unit 105y and supplied to the data selector 103.

Since the data selector 103 has been switched to output the interpolation data from the storage unit 105y based on the control signal from the control circuit 107, the interpolation data is replaced or is inserted in the error portion of the data of the digital audio signal inputted from the data input terminal 101, and then the digital audio signal is outputted from the data output terminal 108. The calculating circuit 111 may not calculate the occurrence probability as shown in Table 5, but may count patterns of preceding and following symbols of the inputted digital audio signal.

In this manner, a interpolation table is generated depending on a supplied digital signal to obtain optimum interpolation data depending on the digital signal.

The method of and the apparatus for interpolating a digital signal according to the present invention are preferably used in the transmission (recording and reproducing) of a digital signal, for example.

Specifically, for transmitting (recording and reproducing) a digital signal, the digital signal is divided into digital signals each having a predetermined number of bits, and a synchronizing signal and an error-correcting code are added to each of the divided digital signals for transmission. FIG. 31 shows an apparatus for recording and reproducing such a digital signal. Those parts shown in FIG. 31 which are identical to those shown in FIG. 25 are denoted by identical reference numerals.

In FIG. 31, an inputted audio signal from an input terminal 121 is supplied through an adder 122 to an integrator 123. A signal from the integrator 123 is supplied to a comparator 124, which compares the supplied signal with a midpoint potential of the inputted audio signal, and quantizes the supplied signal into a 1-bit quantized signal in each of sampling periods. The frequency of the sampling periods (sampling frequency) is 64 or 128 times the conventional sampling frequency of 48 kHz or 44.1 kHz.

The quantized signal is supplied to a delay unit 125, which delays the quantized signal by one sampling period. The delayed signal is then supplied through a 1-bit D/A converter 126 to the adder 122, which adds the delayed signal to the audio signal inputted from the input terminal 121. The comparator 124 outputs a quantized signal representative of the inputted audio signal as it is subjected to $\Sigma\Delta$ modulation. The quantized signal outputted from the comparator 124 is supplied to an adding circuit 127 which adds a synchronizing signal and an error-correcting code (ECC) to a quantized signal per predetermined number of samples. The quantized signal to which the synchronizing signal and the error-correcting code are added is supplied to a recording head 128, which records the quantized signal on a magnetic tape 129 as a recording medium.

Figures 32A, 32B, 32C:
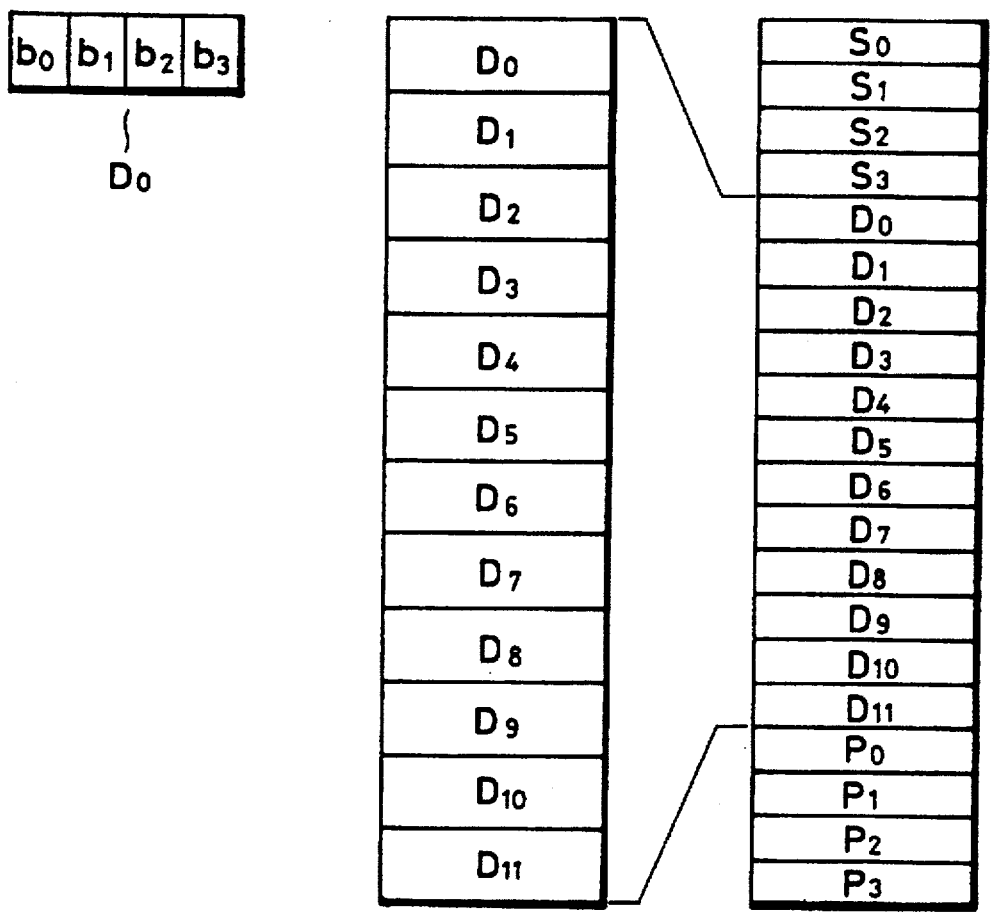
FIGS. 32A, 32B, and 32C are diagrams showing a signal format for the apparatus for recording and reproducing a digital signal according to the present invention.

FIGS. 32A–32C show a signal format for a signal recorded on the recording medium (magnetic tape) 129. A digital signal is divided into data symbols $D_0 D_1 D_2 \ldots$ with 4 bits ($b_0$, $b_1$, $b_2 b_3$) constituting one data symbol $D_0$, as shown in FIG. 32A. As shown in FIG. 32B, 12 data blocks $D_0$–$D_{11}$, for example, are grouped together as one block, and synchronizing signals $S_0$–$S_3$ and error-correcting codes $P_0$–$P_3$ are added to each of such blocks.

The apparatus thus allows a transmission error produced while a signal is being recorded or reproduced to be detected and corrected. The recording and reproducing apparatus may interleave or otherwise process data in order to provide sufficiently against a burst error generated on the magnetic tape.

The signal recorded on the magnetic tape 129 is reproduced by a playback head 130. The reproduced signal is supplied to a synchronizing signal separator and an error-correcting circuit 131, which effects an error correction using the error-correcting codes $P_0$–$P_3$ to obtain a reproduced digital signal. If no error correction is possible, then the synchronizing signal separator and an error-correcting circuit 131 generates an error-detecting signal as described above.

The reproduced digital signal is supplied to the delay circuit 102 and the memory 104, and the generated error-detecting signal is supplied to the control circuit 107. When the error-detecting signal is supplied to the control circuit 107, the control circuit 107 supplies a control signal to the memory 104, which holds 4 bits preceding a digital signal that has suffered the error. The 4 bits are supplied to the ROM table 105 to generate interpolation data. The interpolation data from the ROM table 105 are supplied to the data selector 103, which selects the interpolation data when the error-detecting signal is supplied. The interpolation data are now delivered to the data output terminal 108.

In this manner, an inputted audio signal is subjected to $\Sigma\Delta$ modulation and recorded, and a recorded digital audio signal is error-corrected. If such error correction is not possible, the digital signal is interpolated and reproduced.

Since a digital signal to be recorded or reproduced is divided into digital signals each of a predetermined number of bits, e.g., 4 bits, and an error is corrected in each of the divided digital signals, an error portion is generated in each of the divided digital signals. Therefore, an interpolation process can be carried out in each of the divided digital signals, and an interpolation table can be created in a manner to match each of the divided digital signals. As a result, a good interpolation process can be carried out with a simple arrangement.

With the above methods and apparatus, even if a signal portion is lost from a digital audio signal composed of a small number of bits, such as a 1-bit signal produced by $\Sigma\Delta$ modulation, for example, due to a failure of the transmission system, maximum-level noise is prevented from being produced at the lost signal portion.

Consequently, with the above methods and apparatus according to the present invention, a digital audio signal composed of a small number of bits, such as a 1-bit signal produced by $\Sigma\Delta$ modulation, for example, can be transmitted (recorded and reproduced) without damage to its characteristics. While the present invention has been described with respect to an interpolation process effected on 1-bit data that have been subjected to $\Sigma\Delta$ modulation, the present invention is also applicable to 4-bit data that have been subjected to $\Sigma\Delta$ modulation. It should be noted that various modifications can be made in the present invention without departing from the spirit of the present invention.

I claim:

1. A method for interpolating a digital signal, comprising the steps of:

supplying said digital signal digitized in a predetermined small number of bits to a digital filter;

generating interpolation data for interpolating an error portion of said digital signal from a value produced by supplying a portion of said digital signal other than said error portion to said digital filter and a value produced by supplying said error portion to said digital filter; and interpolating said error portion with said interpolation data.

2. The method according to claim 1, wherein the step of generating interpolation data includes generating said interpolation data by effecting calculations using a value produced by supplying a portion preceding said error portion of said digital signal and a portion following said error portion of said digital signal to said digital filter, and a value produced by supplying said error portion of said digital signal to said digital filter.

3. The method according to claim 2, further comprising the step of outputting as said interpolation data data corresponding to an approximated value based on a result of calculations effected using a value produced by supplying a portion preceding said error portion of said digital signal and a portion following said error portion of said digital signal to said digital filter, and a value produced by supplying said error portion of said digital signal to said digital filter.

4. The method according to claim 2, further comprising the steps of:

determining a sum of a value produced by supplying a portion of said digital signal other than said error portion of said digital signal to the digital filter and a value produced by supplying all available interpolation data to interpolate said error portion of said digital signal to said digital filter;

determining a value at which said value of said sum approximates a value produced by calculations using a value produced by supplying a portion preceding said error portion of said digital signal and a portion following said error portion of said digital signal to said digital filter, and a value produced by supplying said error portion of said digital signal to said digital filter; and outputting as said interpolation data said approximated value.

5. The method according to claim 1, further comprising the steps of:

determining a straight line approximating a value produced by supplying all available interpolation data to interpolate said error portion of said digital signal to said digital filter;

deciding a value approximating a point of intersection between said determined straight line and a 0 level; and outputting said decided value as said interpolation data.

6. The method according to claim 1, comprising the further step of selecting said digital filter to have low-pass filter characteristics.

7. The method according to claim 1, comprising the further step of selecting said digital filter to be a differential digital filter whose coefficients are represented by differences between the coefficients of an original filter shifted by an arbitrary tap length.

8. The method according to claim 7, further including the steps of:

determining a first graph approximating a value produced by supplying all available interpolation data to interpolate said error portion of said digital signal to an arbitrary position of said differential digital filter;

determining a second graph by substituting in said first graph a value produced by supplying data of said digital signal in which said error portion is at an arbitrary position and from which the error portion is removed to said differential digital filter;

determining a third graph approximating a value produced by supplying all available interpolation data to interpolate said error portion to a position of point symmetry of said differential digital filter at an arbitrary position of said differential digital filter;

determining a fourth graph by substituting in said third graph a value produced by supplying said error portion of said digital signal to said differential digital filter at said arbitrary position;

deciding a value approximating a point of intersection between said third graph and said fourth graph; and producing said interpolation data to correspond to said decided value.

9. The method according to claim 1, further comprising the step of modulating said digital signal according to $\Sigma\Delta$ modulation.

10. An apparatus for interpolating a digital signal, comprising:

a digital filter supplied with said digital signal digitized in a predetermined number of bits;

generating means for generating interpolation data based on an output signal produced from said digital filter by supplying a portion of said digital signal other than an error portion of said digital signal to said digital filter and an output signal produced from said digital signal by supplying said error portion of the digital signal to the digital filter; and output means for interpolating said error portion of said digital signal with said interpolation data generated by said generating means.

11. The apparatus according to claim 10, wherein said generating means includes:

first holding means for holding a value produced by supplying a portion of said digital signal preceding said error portion of said digital signal and a portion of said digital signal following said error portion to said digital filter;

second holding means for holding a value produced by supplying said error portion of said digital signal to said digital filter; and calculating means for generating said interpolation data by carrying out calculations using output signals from said first holding means and said second holding means.

12. The apparatus according to claim 10, wherein said generating means includes:

first holding means for holding a value produced by supplying a portion of said digital signal preceding said error portion of said digital signal and a portion of said digital signal following said error portion to said digital filter;

second holding means for holding a value produced by supplying said error portion of said digital signal to said digital filter; and calculating means for carrying out calculations and generating results using output signals from said first and said second holding means and generating said interpolation data based on an approximate value of said results of said calculations.

13. The apparatus according to claim 12, wherein said calculating means includes:

means for determining a sum of a value produced by supplying a portion of said digital signal other than said error portion of said digital signal to the digital filter and a value produced by supplying all interpolation data which can be taken to interpolate said error portion of said digital signal to said digital filter;

means for determining a value at which said value of said sum approximates a value produced by calculations using a value produced by supplying a portion preceding said error portion of said digital signal and a portion following said error portion of said digital signal to said digital filter, and a value produced by supplying said error portion of said digital signal to said digital filter; and outputting as said interpolation data said approximated value.

14. The apparatus according to claim 10, wherein said generating means includes:

calculating means for determining a straight line approximating a value produced by supplying all available interpolation data to interpolate said error portion of said digital signal to said digital filter, wherein said calculating means decides a value approximating a point of intersection between said determined straight line and a 0 level, and outputs said decided value as said interpolation data.

15. The apparatus according to claim 10, wherein said digital filter has low-pass filter characteristics.

16. The apparatus according to claim 10, wherein said digital filter includes a differential digital filter whose coefficients are represented by differences between the coefficients of an original filter shifted by an arbitrary tap length.

17. The apparatus according to claim 16, wherein said generating means includes:

calculating means for determining a first graph approximating a value produced by supplying all available interpolation data to interpolate said error portion of said digital signal to an arbitrary position of said differential digital filter;

calculating means for determining a second graph by substituting in said first graph a value produced by supplying data of said digital signal in which said error portion is at an arbitrary position and from which the error portion is removed to said differential digital filter;

calculating means for determining a third graph approximating a value produced by supplying all interpolation data which can be taken by said error portion to a position of point symmetry of said differential digital filter at an arbitrary position of said differential digital filter;

calculating means for determining a fourth graph by substituting in said third graph a value produced by supplying said error portion of said digital signal to said differential digital filter at said arbitrary position;

calculating means for deciding a value approximating a point of intersection between said third graph and said fourth graph; and calculating means for producing said interpolation data to correspond to said decided value.

18. The apparatus according to claim 10, wherein said digital signal is a digital signal subjected to $\Sigma\Delta$ modulation.

19. An apparatus for interpolating a digital signal, comprising:

generating means for dividing said digital signal in a first predetermined number of bits and dividing said digital signal into digital signals each of a second predetermined number of bits, for determining a probability of occurrence of said divided digital signals, for providing an interpolation table for interpolating the digital signal based on said probability of occurrence, and for generating interpolation data based on said interpolation table when an error occurs in the supplied digital signal; and output means for replacing an error portion of said digital signal with said interpolation data from said generating means and outputting an interpolated digital signal when an error occurs in said digital signal.

20. The apparatus according to claim 19, wherein said generating means further includes:

extracting means for extracting a signal preceding said error portion of said digital signal when an error occurs in said digital signal and generating means for generating interpolation data from said interpolation table based on said signal preceding said error portion of said digital signal extracted by said extracting means.

21. The apparatus according to claim 20, wherein said extracting means further includes means for extracting respective signals preceding and following said error portion of said digital signal when an error occurs in said digital signal, and wherein said generating means generates interpolation data from said interpolation table based on said respective signals preceding and following said error portion of said digital signal extracted by said extracting means.

22. The apparatus according to claim 20, wherein said extracting means further includes means for holding said signal preceding said error portion of said digital signal when an error occurs in said digital signal.

23. The apparatus according to claim 21, wherein said extracting means further includes first and second holding means for holding said respective signals preceding and following said error portion of said digital signal when an error occurs in said digital signal.

24. The apparatus according to claim 19, wherein said generating means includes memory means for storing said interpolation table.

25. The apparatus according to claim 20, further including control means for supplying a control signal to said extracting means to hold said signal preceding said error portion of said digital signal and for supplying another control signal to said output means for switching said digital signal to said interpolated digital signal when an error occurs in said digital signal.

26. The apparatus according to claim 19, wherein said generating means includes a first interpolation table generated based on a first type of digital signal and a second interpolation table generated based on a second type of digital signal, and wherein said generating means includes means for selecting said first interpolation table or said second interpolation table based on said digital signal type to generate said interpolation data.

27. The apparatus according to claim 19, wherein said generating means further includes:

calculating means for calculating a probability of occurrence of data based on said divided digital signals when no error occurs in said digital signal;

holding means for generating and holding an interpolation table based on said probability of occurrence calculated by said calculating means; and means for generating interpolation data based on said interpolation table held by said holding means and for supplying said interpolation data to said output means when an error occurs in said digital signal.

28. The apparatus according to claim 27, wherein said generating means further includes;

extracting means for extracting a signal preceding said error portion of said digital signal when an error occurs in said digital signal; and control means for controlling said holding means and said calculating means to generate an interpolation table when no error occurs in said digital signal, for supplying a control signal to said extracting means to hold said signal preceding said error portion of said digital signal, and for supplying another control signal to said output means for switching said digital signal to said interpolated digital signal when an error occurs in said digital signal.

29. The apparatus according to claim 19, further including delay means for delaying and supplying said digital signal to said output means when no error occurs in said digital signal.

30. The apparatus according to claim 19, wherein said digital signal is a digital signal subjected to $\Sigma\Delta$ modulation.

31. An apparatus for interpolating a digital signal, comprising:

generating means for dividing said digital signal in a first predetermined number of bits and dividing said digital signal into divided digital signals each of a second predetermined number of bits, for determining a probability of occurrence of said divided digital signals when no error occurs in the supplied digital signal, for providing an interpolation table for interpolating said digital signal based on said probability of occurrence, and for generating interpolation data based on said interpolation table when an error occurs in the supplied digital signal; and output means for replacing an error portion of said digital signal with said interpolation data from said generating means and outputting an interpolated digital signal when an error occurs in said digital signal.

32. The apparatus according to claim 31, wherein said generating means further includes:

detecting means for detecting a probability of occurrence of data based on said divided digital signals when no error occurs in said digital signal;

holding means for generating and holding an interpolation table based on said probability of occurrence detected by said detecting means; and means for generating interpolation data based on said interpolation table held by said holding means and for supplying said interpolation data to said output means when an error occurs in said digital signal.

33. The apparatus according to claim 32, wherein said generating means further includes:

extracting means for extracting a signal preceding said error portion of said digital signal when an error occurs in said digital signal; and control means for controlling said holding means and said detecting means to generate an interpolation table when no error occurs in said digital signal, for supplying a control signal to said extracting means to hold said signal preceding said error portion of said digital signal, and for supplying another control signal to said output means for switching said digital signal to said interpolated digital signal when an error occurs in said digital signal.

34. The apparatus according to claim 31, wherein said digital signal is a digital signal subjected to $\Sigma\Delta$ modulation.

27

35. A method of interpolating a digital signal, comprising the steps of:

dividing said digital signal digitized in a first predetermined number of bits and dividing said digital signal into divided digital signals each of a second predetermined number of bits;

determining a probability of occurrence of said divided digital signals and generating an interpolation table for interpolating said digital signal based on said probability of occurrence; and interpolating said digital signal based on said interpolation table when an error occurs in said digital signal.

36. The method according to claim 35, further comprising the step of generating interpolation data for said interpolation table based on a signal preceding an error portion of said digital signal when an error occurs in said digital signal.

37. The method according to claim 35, further comprising the step of generating interpolation data for said interpolation table based on respective signals preceding and following an error portion of said digital signal when an error occurs in said digital signal.

38. The method according to claim 35, further comprising the steps of:

providing a first interpolation table generated based on a first type of digital signal and a second interpolation table generated based on a second type of digital signal; and selectively using said first interpolation table and said second interpolation table based on said digital signal type to generate said interpolation data.

39. The method according to claim 35, further comprising the steps of:

calculating a probability of occurrence of data based on said divided digital signals when no error occurs in said digital signal; and generating interpolation data based on a generated interpolation table data to said output means when an error occurs in the supplied from said probability of occurrence.

40. The method according to claim 35, further comprising the step of modulating said digital signal accordance to $\Sigma\Delta$ modulation.

41. An apparatus for recording and/or playing back a recording medium, comprising:

converting means for converting an input signal into a digital signal digitized in a predetermined small number of bits;

head means for recording said digital signal converted by said converting means on said recording medium and reading said digital signal recorded on said recording medium;

detecting means for detecting whether an error occurred in said digital signal read by said head means;

generating means for generating interpolation data and an interpolation table based on data preceding an error portion of said digital signal when said error is detected by said detecting means; and output means for replacing said error portion of said digital signal read by said head means with said interpolation data generated by said generating means and outputting an interpolated digital signal when an error occurs in said digital signal.

28

42. The apparatus according to claim 41, wherein said generating means further comprises means for dividing said digital signal read by said head means into divided digital signals each of predetermined number of bits, for determining a probability of occurrence of said divided digital signals, for providing an interpolation table for interpolating said digital signal based on said probability of occurrence, and for generating interpolation data based on said interpolation table when an error occurs in said digital signal.

43. The apparatus according to claim 41, wherein said converting means includes $\Sigma\Delta$ modulation means for effecting $\Sigma\Delta$ modulation on said input signal.

44. The apparatus according to claim 41, wherein said generating means further includes:

extracting means for extracting a signal preceding said error portion of said digital signal when an error occurs in said digital signal; and means for generating interpolation data from said interpolation table based on a signal preceding said error portion of said supplied digital signal.

45. The apparatus according to claim 44, further comprising control means for supplying a control signal to said extracting means to hold said signal preceding said error portion of said digital signal and for supplying another control signal to said output means for switching said digital signal to said interpolated digital signal when an error occurs in said digital signal.

46. A method for recording and/or playing back a recording medium, comprising the steps of:

converting an input signal into a digital signal digitized in a predetermined number of bits;

recording said digital signal on said recording medium and reading said digital signal recorded on said recording medium;

detecting whether an error occurred in sad digital signal read from said recording medium;

generating interpolation data and an interpolation table based on data preceding an error portion of said digital signal when said error is detected by said detecting step; and replacing said error portion of said digital signal read from said recording medium with said interpolation data and outputting an interpolated digital signal when an error occurs in said digital signal.

47. The method according to claim 46, further comprising the steps of:

dividing said digital signal read from said recording medium into divided digital signals each of a second predetermined number of bits;

determining a probability of occurrence of said divided digital signals;

generating an interpolation table for interpolating said digital signal based on said probability of occurrence; and generating interpolation data based on said interpolation table when an error occurs in said digital signal.

48. The method according to claim 46, further comprising the step of effecting $\Sigma\Delta$ modulation on said input signal.

* * * * *